(12) United States Patent
Ning et al.

(10) Patent No.: US 8,472,165 B2
(45) Date of Patent: Jun. 25, 2013

(54) CONDUCTIVE POLYMER SOLUTION, CONDUCTIVE COATING, CONDENSER AND PROCESS FOR MANUFACTURING CONDENSER

(75) Inventors: Tailu Ning, Saitama (JP); Kazuyoshi Yoshida, Kazo (JP); Yasushi Masahiro, Saitama (JP); Sou Matsubayashi, Koshigaya (JP); Rika Abe, Kawagoe (JP); Mitsuaki Negishi, Kitakatsushika-gun (JP)

(73) Assignee: Shin-Etsu Polymer Co., Ltd. (JP)

( * ) Notice: Subject to any disclaimer, the term of this patent is extended or adjusted under 35 U.S.C. 154(b) by 865 days.

(21) Appl. No.: 12/278,605

(22) PCT Filed: Feb. 8, 2007

(86) PCT No.: PCT/JP2007/052277
§ 371 (c)(1),
(2), (4) Date: Aug. 7, 2008

(87) PCT Pub. No.: WO2007/091656
PCT Pub. Date: Aug. 16, 2007

(65) Prior Publication Data
US 2009/0021894 A1    Jan. 22, 2009

(30) Foreign Application Priority Data

Feb. 9, 2006 (JP) .............................. P2006-032174
Mar. 3, 2006 (JP) .............................. P2006-058169
Mar. 16, 2006 (JP) .............................. P2006-072711
Mar. 20, 2006 (JP) .............................. P2006-076277
Jul. 20, 2006 (JP) .............................. P2006-198114

(51) Int. Cl.
*H01G 9/02* (2006.01)

(52) U.S. Cl.
USPC .......................................... 361/525; 252/62.2

(58) Field of Classification Search
USPC .......................... 361/525, 526, 523; 252/62.2
See application file for complete search history.

(56) References Cited

U.S. PATENT DOCUMENTS 4,780,796 A    10/1988    Fukuda et al. ................. 361/433
4,933,106 A    6/1990    Sakai et al. .................... 252/500

(Continued)

FOREIGN PATENT DOCUMENTS

CN    1651490 A    8/2005
EP    1 524 678    4/2005

(Continued)

OTHER PUBLICATIONS

Partial European Search Report dated Dec. 4, 2009 in corresponding European Patent Application No. EP 09 01 2178 (English language).

(Continued)

*Primary Examiner* — David M Sinclair
(74) *Attorney, Agent, or Firm* — Ostrolenk Faber LLP

(57) ABSTRACT

The object of the present invention is to provide a condenser that exhibits excellent conductivity of the solid electrolyte layer, and has a low ESR, a high degree of heat resistance, and a high withstand voltage. A condenser of the present invention includes an anode composed of a valve metal, a dielectric layer formed by oxidation of the surface of the anode, and a solid electrolyte layer formed on the surface of the dielectric layer, wherein the solid electrolyte layer contains a π-conjugated conductive polymer, a polyanion, and an amide compound.

9 Claims, 2 Drawing Sheets

U.S. PATENT DOCUMENTS

| | | | |
|---|---|---|---|
| 5,378,402 A | | 1/1995 | Cross et al. |
| 5,526,224 A | * | 6/1996 | Kanbara et al. ............... 361/523 |
| 5,783,111 A | | 7/1998 | Ikkala et al. .................. 252/500 |
| 6,344,966 B1 | | 2/2002 | Monden et al. ............... 361/524 |
| 6,987,663 B2 | | 1/2006 | Merker et al. |
| 7,088,572 B2 | * | 8/2006 | Yoshida et al. ............... 361/504 |
| 7,250,461 B2 | * | 7/2007 | Hsu et al. ...................... 524/445 |
| 7,279,015 B2 | * | 10/2007 | Merker ........................ 29/25.03 |
| 2003/0062510 A1 | | 4/2003 | Van den Bogaert .......... 252/500 |
| 2004/0212951 A1 | * | 10/2004 | Monden et al. ............... 361/523 |
| 2005/0111165 A1 | * | 5/2005 | Merker et al. ................ 361/525 |
| 2005/0151122 A1 | | 7/2005 | Jiang et al. .................... 252/500 |
| 2005/0222333 A1 | * | 10/2005 | Hsu ................................ 525/178 |
| 2006/0047030 A1 | | 3/2006 | Yoshida et al. ................. 524/99 |
| 2006/0062958 A1 | | 3/2006 | Yoshida et al. ............. 428/64.4 |
| 2006/0076541 A1 | | 4/2006 | Yoshida et al. ............... 252/500 |
| 2006/0236531 A1 | * | 10/2006 | Merker et al. .................. 29/746 |
| 2007/0085061 A1 | * | 4/2007 | Elder et al. .................... 252/500 |
| 2007/0134530 A1 | * | 6/2007 | Nakamura et al. ............. 429/30 |

FOREIGN PATENT DOCUMENTS

| | | |
|---|---|---|
| EP | 1 634 922 | 3/2006 |
| JP | 63-158829 | 7/1988 |
| JP | 63-173313 | 7/1988 |
| JP | 7-105718 | 4/1995 |
| JP | 9-306788 | 11/1997 |
| JP | 11-74157 | 3/1999 |
| JP | 11-329900 | 11/1999 |
| JP | 2002-526914 | 8/2002 |
| JP | 2003-037024 | 2/2003 |
| JP | 2005-25213 | 1/2005 |
| JP | 2005-109079 | 4/2005 |
| JP | 2006/089554 | 4/2006 |
| JP | 2006-096975 | 4/2006 |
| JP | 2006-131873 | 5/2006 |
| JP | 2006-249128 | 9/2006 |
| JP | 2006-265297 | 10/2006 |
| JP | 2006-328276 | 12/2006 |
| JP | 2007-045932 | 2/2007 |
| TW | 586131 | 5/2004 |
| WO | WO 00/19469 | 4/2000 |
| WO | WO 2004/113441 | 12/2004 |

OTHER PUBLICATIONS

Taiwan Office Action, dated Dec. 29, 2010, issued in corresponding Taiwanese Patent Application No. 096104371, with English translation. Total 18 pages.

Chinese Office Action, dated Mar. 23, 2011, issued in corresponding Chinese Patent Application No. 200780004986.8, with English translation. Total 10 pages.

Supplementary European Search Report in corresponding International Application PCT/JP2007/052277, dated Jun. 29, 2009.

International Search Report mailed May 15, 2007 in corresponding PCT/JP2007/052277, in Japanese with English translation.

Office Action dated Oct. 4, 2011 issued in corresponding Japanese Patent Application No. 2007-557896 with English translation (4 pages).

Decision of Rejection dated Feb. 22, 2012 issued in corresponding Chinese Patent Application No. 200780004986.8 with English translation (11 pages).

\* cited by examiner

CONDUCTIVE POLYMER SOLUTION, CONDUCTIVE COATING, CONDENSER AND PROCESS FOR MANUFACTURING CONDENSER

CROSS-REFERENCE TO RELATED APPLICATIONS

The present application is a 35 U.S.C. §§371 national phase conversion of PCT/JP2007/052277, filed Feb. 8, 2007, which claims priority of Japanese Patent Application No. 2006-32174, filed Feb. 9, 2006, Japanese Patent Application No. 2006-58169, filed Mar. 3, 2006, Japanese Patent Application No. 2006-72711, filed Mar. 16, 2006, Japanese Patent Application No. 2006-76277, filed Mar. 20, 2006, and Japanese Patent Application No. 2006-198114, filed Jul. 20, 2006, the contents of which are incorporated herein by reference. The PCT International Application was published in the Japanese language.

TECHNICAL FIELD

The present invention relates to a condenser such as an aluminum electrolytic condenser, a tantalum electrolytic condenser or a niobium electrolytic condenser, and a process for manufacturing such a condenser. The present invention also relates to a conductive polymer solution and a conductive coating containing a π-conjugated conductive polymer.

BACKGROUND ART

In recent years, accompanying the digitalization of electronic equipment, there has been a growing demand for reductions in the high-frequency region impedance (the equivalent series resistance (hereafter also abbreviated as ESR)) of the condensers used in the electronic equipment. Conventionally, in order to satisfy these demands, so-called functional condensers (hereafter abbreviated to simply "condensers") that use an oxide film of a valve metal such as aluminum, tantalum or niobium as a dielectric body have been used.

As disclosed in Patent Document 1, the structures of these condensers typically include an anode composed of a porous body of a valve metal, a dielectric layer formed by oxidizing the surface of the anode, a conductive solid electrolyte layer, and a cathode on which is laminated a carbon layer or a silver layer or the like. A conductive film containing a π-conjugated conductive polymer may be used as the solid electrolyte layer.

Widely known processes for forming a conductive film containing a π-conjugated conductive polymer include electrolytic polymerization processes in which a conductive layer composed of a manganese oxide is formed in advance on the surface of a valve metal porous body, and this conductive layer is then used as an electrode for performing the electrolytic polymerization (see Patent Document 2), and chemical oxidative polymerization processes in which a precursor monomer that generates the π-conjugated conductive polymer is polymerized using an oxidant (see Patent Document 3).

As a process for forming a conductive film other than the electrolytic polymerization process and chemical oxidative polymerization process described above, a process has been proposed in which aniline is subjected to a chemical oxidative polymerization in the presence of a polyanion having, for example, a sulfo group and a carboxyl group, thereby forming a water-soluble polyaniline, and then applying and drying an aqueous solution of the polyaniline to form a coating (see Patent Document 4). With this process, a conductive film with a high degree of conductivity can be formed relatively simply.

Further, condensers require a high capacitance. In order to achieve a high capacitance, a process has been proposed in which, by finely controlling the temperature conditions of the chemical oxidative polymerization, the solid electrolyte layer can be formed satisfactorily within the interior of the dielectric layer (see Patent Document 5).

Moreover, in order to prevent shorting between the anode and the solid electrolyte layer, a solid electrolytic condenser has been proposed in which a polyimide silicone layer is first formed on the surface of the dielectric layer, and an oxidative polymerization process is then used to form a conductive polymer layer (see Patent Document 6).

[Patent Document 1]
Japanese Unexamined Patent Application, First Publication No. 2003-37024
[Patent Document 2]
Japanese Unexamined Patent Application, First Publication No. Sho 63-158829
[Patent Document 3]
Japanese Unexamined Patent Application, First Publication No. Sho 63-173313
[Patent Document 4]
Japanese Unexamined Patent Application, First Publication No. Hei 7-105718
[Patent Document 5]
Japanese Unexamined Patent Application, First Publication No. Hei 11-74157
[Patent Document 6]
Japanese Unexamined Patent Application, First Publication No. 2005-109079

DISCLOSURE OF INVENTION

Problems to be Solved by the Invention

However, in the electrolytic polymerization process disclosed in Patent Document 2, the step of forming the conductive layer composed of a manganese oxide is not only complex, but the formed manganese oxide has also low conductivity, and therefore a problem arises in that the effect of using a highly conductive π-conjugated conductive polymer is weakened.

Furthermore, in the chemical oxidative polymerization process disclosed in Patent Document 3, the polymerization time is long, and repeated polymerizations must be performed to ensure the required film thickness, meaning the formation efficiency for the conductive film is poor, and the conductivity achieved is also lower than that obtained using an electrolytic polymerization. If the conductivity of the condenser is low, then a problem arises in that the equivalent series resistance increases.

Moreover, in the process for manufacturing a conductive film disclosed in Patent Document 4, because the film includes a non-conductive polyanion, the conductivity of the resulting conductive film is low.

Furthermore, when forming the solid electrolyte layer of a condenser, if the conductive film formation processes disclosed in Patent Documents 2 to 4 are employed, then another problem arises in that the withstand voltage of the condenser tends to fall. A generally known process for increasing the withstand voltage involves increasing the anodization voltage and increasing the thickness of the dielectric layer, but if the dielectric layer is increased in thickness, then the condenser also becomes thicker, making it impossible to satisfy recent demands for thinner devices.

Moreover, with the polyaniline aqueous solution obtained in the process disclosed in Patent Document 4, because corrosion of the dielectric layer can not be prevented satisfactorily, it is impossible to prevent increases in the leakage current from the dielectric layer. As a result, a condenser that uses a conductive coating formed from the polyaniline aqueous solution disclosed in Patent Document 4 as the solid electrolyte layer suffers from increased equivalent series resistance (ESR), meaning the condenser is unable to conform to recent demands for reduced impedance.

Further, in the process disclosed in Patent Document 5, although the capacitance of the condenser is able to be increased, an already complex chemical oxidative polymerization is often made even more complex, meaning the process is impractical in terms of simplifying the manufacturing process and reducing the manufacturing costs.

Moreover, because condensers may sometimes be used in high-temperature environments, they require heat resistance, but even if a solid electrolyte layer is formed using one of the processes disclosed in Patent Documents 2 to 5, achieving a condenser with a high degree of heat resistance is still problematic.

In addition, in the condenser disclosed in Patent Document 6, although the polyimide silicone layer exhibits excellent adhesiveness, when exposed to thermal stress it is unable to prevent shorting between the anode and the solid electrolyte layer. Further, based on investigations conducted by the inventors of the present invention into the cause of this problem, it was discovered that the difference in the coefficients of thermal expansion for the polyimide silicone layer and the dielectric layer was very large, and this difference caused defects within the dielectric layer as it was unable to conform to the thermal expansion of the polyimide silicone layer.

An object of the present invention is to provide a condenser that exhibits excellent conductivity of the solid electrolyte layer, and has a low ESR and a high degree of heat resistance. Furthermore, another object of the present invention is to provide a process for manufacturing a condenser that is capable of simply manufacturing a condenser that has a low ESR, a high degree of heat resistance and a high capacitance.

Yet another object of the present invention is to provide a condenser that exhibits a high withstand voltage even when the thickness of the dielectric layer is reduced. Furthermore, yet another object of the present invention is to provide a process for manufacturing a condenser that is capable of simply manufacturing a condenser that exhibits a high withstand voltage even when the thickness of the dielectric layer is reduced.

Moreover, yet another object of the present invention is to provide a condenser in which shorting between the anode and the solid electrolyte layer is prevented even upon exposure to thermal stress. Yet another object is to provide a process for simply manufacturing such a condenser.

In addition, yet another object of the present invention is to provide a conductive polymer solution that is capable of forming a highly conductive coating and yet exhibits minimal corrosive properties. Further, yet another object is to provide a conductive coating that exhibits a high degree of conductivity but minimal corrosive properties.

Means to Solve the Problems

A condenser according to a first aspect of the present invention is a condenser including an anode composed of a porous body of a valve metal, a dielectric layer formed by oxidation of the surface of the anode, and a solid electrolyte layer formed on the surface of the dielectric layer, wherein the solid electrolyte layer contains a π-conjugated conductive polymer, a polyanion, and an amide compound.

In the condenser of the present invention, the amide compound preferably contains one or more hydroxyl groups.

In the condenser of the present invention, the solid electrolyte layer preferably further contains an ion-conductive polymer.

In the condenser of the present invention, the amide compound may be a compound represented by Chemical Formula (I) shown below.

[Chemical Formula 1]

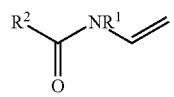

(1)

(wherein, $R^1$ and $R^2$ each independently represent a hydrogen atom, or an alkyl group or an alkylene group that may be substituted)

In the condenser of the present invention, the quantity of the compound represented by Chemical Formula (1) within the solid electrolyte layer is preferably within a range from 15 to 60% by mass.

Furthermore, a condenser according to a second aspect of the present invention is a condenser including an anode composed of a porous body of a valve metal, a dielectric layer formed by oxidation of the surface of the anode, and a solid electrolyte layer formed on the surface of the dielectric layer, wherein the solid electrolyte layer contains a π-conjugated conductive polymer, a polyanion, a conductivity improver, and a silane coupling agent.

In the condenser according to this aspect of the present invention, the conductivity improver is preferably one or more compounds selected from the group consisting of nitrogen-containing aromatic cyclic compounds, compounds containing two or more hydroxyl groups, compounds containing two or more carboxyl groups, compounds containing one or more hydroxyl groups and one or more carboxyl groups, compounds containing an amide group, compounds containing an imide group, lactam compounds, and compounds containing a glycidyl group.

Furthermore, a condenser according to a third aspect of the present invention is a condenser including an anode composed of a valve metal, a dielectric layer that is an oxidized film of the anode formed on the surface of the anode, and a solid electrolyte layer that is formed on the opposite side from the anode of the dielectric layer and contains a π-conjugated conductive polymer, wherein an intermediate layer containing a low-thermal expansion polymer having an average coefficient of thermal expansion within a range from 30 to 120° C. of not more than 300 ppm/° C. is provided between the dielectric layer and the solid electrolyte layer.

A process for manufacturing a condenser according to the present invention includes: adhering a conductive polymer solution containing a 1-conjugated conductive polymer, a polyanion, an amide compound and a solvent to the surface of a dielectric layer formed by oxidizing the surface of an anode composed of a porous body of a valve metal, and drying the conductive polymer solution adhered to the surface of the dielectric layer.

In the process for manufacturing a condenser according to the present invention, the amide compound may be a compound represented by Chemical Formula (I) shown above.

Furthermore, another aspect of the process for manufacturing a condenser of the present invention includes: adhering a conductive polymer solution containing a π-conjugated conductive polymer, a polyanion, a conductivity improver, a silane coupling agent and a solvent to the surface of a dielectric layer formed by oxidizing the surface of an anode composed of a porous body of a valve metal, and drying the conductive polymer solution adhered to the surface of the dielectric layer.

In a process for manufacturing a condenser according to the present invention, the pH of the conductive polymer solution at 25° C. is preferably within a range from 3 to 13.

Furthermore, yet another aspect of the process for manufacturing a condenser of the present invention includes: applying a low-thermal expansion polymer solution, prepared by dissolving a low-thermal expansion polymer having an average coefficient of thermal expansion within a range from 30 to 120° C. of not more than 300 ppm/° C. in a solvent, to the surface of a dielectric layer formed by oxidizing one surface of an anode composed of a valve metal, thereby forming an intermediate layer, and applying a conductive polymer solution, prepared by dissolving a π-conjugated conductive polymer and a polyanion in a solvent, to the surface of the intermediate layer, thereby forming a solid electrolyte layer.

A conductive polymer solution of the present invention contains a π-conjugated conductive polymer, a polyanion, a conductivity improver, an alkaline compound and a solvent.

In the conductive polymer solution of the present invention, the conductivity improver is preferably one or more compounds selected from the group consisting of nitrogen-containing aromatic cyclic compounds, compounds containing two or more hydroxyl groups, compounds containing two or more carboxyl groups, compounds containing one or more hydroxyl groups and one or more carboxyl groups, compounds containing an amide group, compounds containing an imide group, lactam compounds, and compounds containing a glycidyl group.

In the conductive polymer solution of the present invention, the alkaline compound is preferably a nitrogen-containing aromatic cyclic compound.

In the conductive polymer solution of the present invention, the solvent is preferably a mixed solvent containing water and an organic solvent having a boiling point of 100° C. or higher at a pressure of 0.1 MPa.

A conductive coating of the present invention is formed by applying and drying the conductive polymer solution described above.

A condenser of the present invention includes an anode composed of a porous body of a valve metal, a dielectric layer formed by oxidation of the surface of the anode, and a solid electrolyte layer, wherein the solid electrolyte layer is formed from the conductive coating described above.

A process for manufacturing a condenser according to the present invention includes: forming a solid electrolyte layer by applying the conductive polymer solution described above to the surface of a dielectric layer formed by oxidizing the surface of an anode composed of a valve metal.

EFFECT OF THE INVENTION

A condenser of the present invention exhibits excellent conductivity of the solid electrolyte layer, and has a low ESR and a high degree of heat resistance. In addition, because shorting between the anode and the solid electrolyte layer is prevented even upon exposure to thermal stress, the failure rate during manufacture of the condenser can be reduced. Moreover, a condenser of the present invention exhibits a high withstand voltage even when the thickness of the dielectric layer is reduced.

According to a process for manufacturing a condenser according to the present invention, a condenser that has a low ESR, a high degree of heat resistance and a high capacitance, and in which shorting between the anode and the solid electrolyte layer is prevented even upon exposure to thermal stress, can be produced simply. Further, according to the process for manufacturing a condenser of the present invention, the withstand voltage is high even when the thickness of the dielectric layer is reduced.

A conductive polymer solution of the present invention is capable of forming a coating of high conductivity, and also exhibits minimal corrosive properties. Further, a conductive coating of the present invention has a high degree of conductivity and minimal corrosive properties.

DESCRIPTION OF THE REFERENCE SYMBOLS

| | |
|---|---|
| 10 | Condenser |
| 11 | Anode |
| 12 | Dielectric layer |
| 13 | Solid electrolyte layer |
| 14 | Cathode |
| 15 | Separator |
| 16 | Intermediate layer |

BEST MODE FOR CARRYING OUT THE INVENTION

<Condenser>

An embodiment of a condenser of the present invention is described below.

Figure 1:
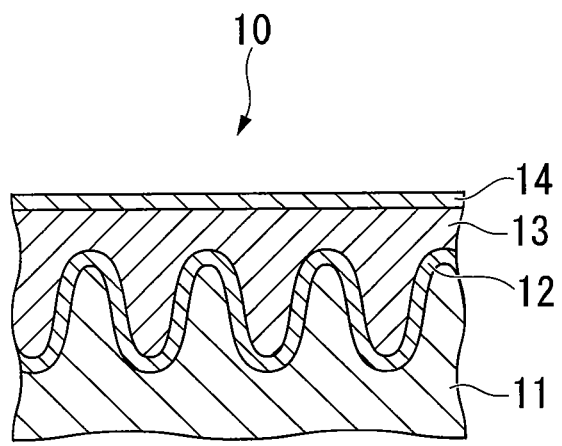
FIG. 1 is a cross-sectional view showing one embodiment of a condenser of the present invention.

FIG. 1 is a diagram showing the structure of the condenser of this embodiment. A condenser 10 of the present embodiment has a basic structure including an anode 11 composed of a porous body of a valve metal, a dielectric layer 12 that is formed by oxidation of the surface of the anode 11, a solid electrolyte layer 13 that is formed on the surface of the dielectric layer 12, and a cathode 14.

Figure 2:
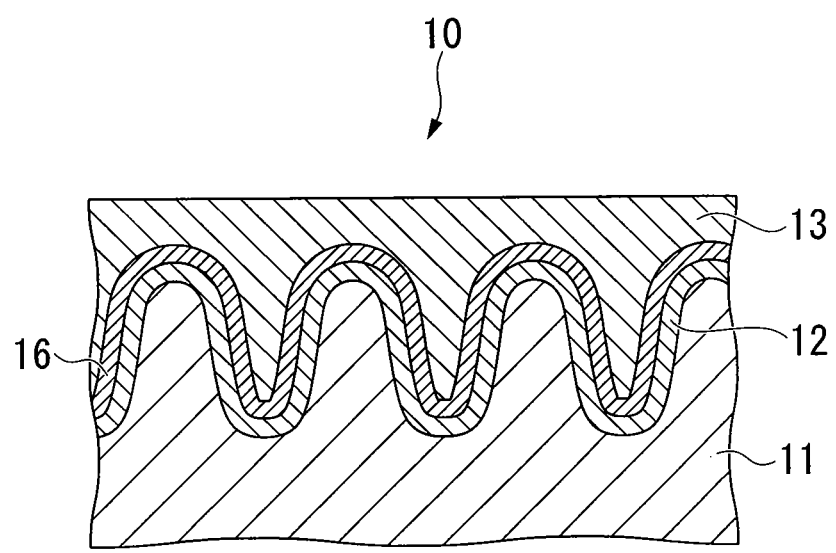
FIG. 2 is a cross-sectional view showing another embodiment of the condenser of the present invention.

Furthermore, as shown in FIG. 2, in another embodiment of the condenser of the present invention, the condenser 10 has a basic structure that includes an intermediate layer 16 provided between the dielectric layer 12 and the solid electrolyte layer 13.

(Anode)

Examples of the valve metal that constitute the anode 11 include aluminum, tantalum, niobium, titanium, hafnium, zirconium, zinc, tungsten, bismuth and antimony. Of these, aluminum, tantalum and niobium are preferred as they can form a dense dielectric layer with a high degree of durability, and also enable a high capacitance to be obtained in a stable manner.

Specific examples of the anode 11 include anodes prepared by etching an aluminum foil to increase the surface area, and then subjecting the surface to an oxidation treatment, and anodes prepared by subjecting the surface of a sintered body of tantalum particles or niobium particles to an oxidation treatment, and then forming pellets. An anode 11 treated in this manner has irregularities formed within the surface.

(Dielectric Layer)

The dielectric layer 12 is formed, for example, by anodization of the surface of the anode 11 within an electrolyte such as an aqueous solution of ammonium adipate. Accordingly, as shown in FIG. 1, the dielectric layer 12 conforms and follows the irregular surface of the anode 11.

The dielectric layer 12 formed from the oxidized film of the above valve metal generally has a coefficient of thermal expansion that is not more than 15 ppm/° C. For example, in those cases where the dielectric layer 12 is formed from aluminum oxide, the coefficient of thermal expansion is within a range from approximately 5 to 7 ppm/° C. The coefficient of thermal expansion for an oxide of a metal is generally smaller than that for the metal itself, and therefore in those cases where the dielectric layer 12 is formed from tantalum oxide, it is assumed that the coefficient of thermal expansion will be not more than the 6.5 ppm/° C. that represents the coefficient of thermal expansion of metallic tantalum.

(Intermediate Layer)

The intermediate layer 16 is a layer containing a low-thermal expansion polymer having an average coefficient of thermal expansion within a range from 30 to 120° C. of not more than 300 ppm/° C. Examples of this low-thermal expansion polymer include polyurethanes, polyesters, polyamides, polyimides, polyetherimides, polyetherketones, polyetheretherketones, polycarbonates, phenolic resins, melamine resins, and acrylic resins and the like.

The upper limit for the average coefficient of thermal expansion of the low-thermal expansion polymer within the range from 30 to 120° C. is preferably 150 ppm/° C., and the lower limit is preferably 2 ppm/° C., and even more preferably 5 ppm/° C.

Furthermore, in order to reduce the failure rate during manufacture, the low-thermal expansion polymer preferably has a coefficient of thermal expansion within a range from room temperature to approximately 150° C. that is substantially equal to the coefficient of thermal expansion for the dielectric layer 12.

The quantity of the low-thermal expansion polymer within the intermediate layer 16 is preferably within a range from 0.5 to 100% by mass. Provided the quantity of the low-thermal expansion polymer is at least 0.5% by mass, shorting between the anode 11 and the solid electrolyte layer 13 caused by thermal stress can be effectively prevented.

(Solid Electrolyte Layer)

The solid electrolyte layer 13 is a layer that includes, as essential components, a π-conjugated conductive polymer, a polyanion, and either an amide compound or a combination of a conductivity improver and a silane coupling agent. The thickness of the solid electrolyte layer 13 is preferably within a range from 1 to 50 μm.

<π-Conjugated Conductive Polymer>

The π-conjugated conductive polymer can use any organic polymer in which the main chain is composed of a π-conjugated system. Examples include polypyrroles, polythiophenes, polyacetylenes, polyphenylenes, polyphenylenevinylenes, polyanilines, polyacenes, polythiophenevinylenes, and copolymers thereof. In terms of the ease of polymerization, and the stability of the polymer in air, polypyrroles, polythiophenes and polyanilines are preferred.

The π-conjugated conductive polymer is able to provide adequate conductivity even in an unsubstituted form, but in order to further enhance the conductivity, it is preferable that functional groups such as alkyl groups, carboxyl groups, sulfo groups, alkoxyl groups, hydroxyl groups and cyano groups are introduced into the π-conjugated conductive polymer.

Specific examples of this type of π-conjugated conductive polymer include polypyrrole, poly(N-methylpyrrole), poly (3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly (3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly (3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly (3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), and poly(3-anilinesulfonic acid).

Of these, a (co)polymer composed of either one or two compounds selected from polypyrrole, polythiophene, poly (N-methylpyrrole), poly(3-methylthiophene), poly(3-methoxythiophene) and poly(3,4-ethylenedioxythiophene) can be used particularly favorably in terms of the resistance and the reactivity. Moreover, polypyrrole and poly(3,4-ethylenedioxythiophene) yield a greater increase in conductivity and also offer improved heat resistance, and are therefore particularly desirable.

The quantity of the π-conjugated conductive polymer within the solid electrolyte layer 13 is preferably at least 1% by mass, and is even more preferably 5% by mass or more.

<Polyanion>

The polyanion is a homopolymer or copolymer selected from substituted or unsubstituted polyalkylenes, substituted or unsubstituted polyalkenylenes, substituted or unsubstituted polyimides, substituted or unsubstituted polyamides and substituted or unsubstituted polyesters, and is composed of structural units having an anion group. If required, the polyanion may also include structural units having no anion group.

The polyanion not only makes the π-conjugated conductive polymer soluble in the solvent, but also functions as a dopant for the π-conjugated conductive polymer.

Here, a polyalkylene describes a polymer in which the main chain is composed of repeating methylene units. Examples include polyethylene, polypropylene, polybutene, polypentene, polyhexene, polyvinyl alcohol, polyvinylphenol, poly(3,3,3-trifluoropropylene), polyacrylonitrile, polyacrylate and polystyrene.

A polyalkenylene is a polymer composed of structural units having one or more unsaturated bonds (vinyl groups) within the main chain. Of these, substituted or unsubstituted butenylenes are preferred because they exhibit an interaction between the unsaturated bonds and the π-conjugated conductive polymer, and are readily synthesized using a substituted or unsubstituted butadiene as the starting material.

Specific examples of the polyalkenylenes include polymers containing one or more structural units selected from propenylene, 1-methylpropenylene, 1-butylpropenylene, 1-decylpropenylene, 1-cyanopropenylene, 1-phenylpropenylene, 1-hydroxypropenylene, 1-butenylene, 1-methyl-1-butenylene, 1-ethyl-1-butenylene, 1-octyl-1-butenylene, 1-pentadecyl-1-butenylene, 2-methyl-1-butenylene, 2-ethyl-1-butenylene, 2-butyl-1-butenylene, 2-hexyl-1-butenylene, 2-octyl-1-butenylene, 2-decyl-1-butenylene, 2-dodecyl-1-butenylene, 2-phenyl-1-butenylene, 2-butenylene, 1-methyl-2-butenylene, 1-ethyl-2-butenylene, 1-octyl-2-butenylene, 1-pentadecyl-2-butenylene, 2-methyl-2-butenylene, 2-ethyl-2-butenylene, 2-butyl-2-butenylene, 2-hexyl-2-butenylene, 2-octyl-2-butenylene, 2-decyl-2-butenylene, 2-dodecyl-2-butenylene, 2-phenyl-2-butenylene, 2-propylenephenyl-2-butenylene, 3-methyl-2-butenylene, 3-ethyl-2-butenylene, 3-butyl-2-butenylene, 3-hexyl-2-butenylene, 3-octyl-2-butenylene, 3-decyl-2-butenylene, 3-dodecyl-2-butenylene, 3-phenyl-2-butenylene, 3-propylenephenyl-2-butenylene, 2-pentenylene, 4-propyl-2-pentenylene, 4-butyl-2-pentenylene, 4-hexyl-2-pentenylene, 4-cyano-2-pentenylene, 3-methyl-2-pentenylene, 4-ethyl-2-pentenylene, 3-phenyl-2-pentenylene, 4-hydroxy-2-pentenylene, and hexenylene and the like.

Examples of the polyimides include polyimides formed from an anhydride such as pyromellitic dianhydride, biphenyltetracarboxylic dianhydride, benzophenone tetracarboxylic dianhydride, 2,2',3,3'-tetracarboxydiphenyl ether dianhydride or 2,2'-[4,4'-di(dicarboxyphenyloxy)phenyl]propane dianhydride, and a diamine such as oxydiamine, para-phenylenediamine, meta-phenylenediamine or benzophenonediamine.

Examples of the polyamides include polyamide 6, polyamide 66 and polyamide 610 and the like.

Examples of the polyesters include polyethylene terephthalate and polybutylene terephthalate and the like.

In those cases where the polyanion has substituents, examples of those substituents include alkyl groups, hydroxyl groups, amino groups, cyano groups, phenyl groups, phenol groups, ester groups, alkoxyl groups and carbonyl groups. Considering factors such as the solubility of the polyanion in solvents, the heat resistance, and the compatibility of the polyanion with resins, alkyl groups, hydroxyl groups, phenol groups and ester groups are preferred.

Alkyl groups can improve the solubility and dispersibility of the polyanion in polar solvents or non-polar solvents, and improve the compatibility with, and dispersibility within resins, whereas hydroxyl groups can readily form hydrogen bonds with other hydrogen atoms or the like, thereby improving the solubility within organic solvents and the compatibility with, dispersibility within, and adhesion to resins. Moreover, cyano groups and hydroxyphenyl groups can improve the compatibility with, and solubility within polar resins, and can also enhance the heat resistance.

Of the above substituents, alkyl groups, hydroxyl groups, ester groups and cyano groups are preferred.

Examples of the alkyl groups include chain-like alkyl groups such as methyl, ethyl, propyl, butyl, isobutyl, t-butyl, pentyl, hexyl, octyl, decyl and dodecyl groups, and cycloalkyl groups such as cyclopropyl, cyclopentyl and cyclohexyl groups. Considering factors such as the solubility within organic solvents, the dispersibility within resins, and steric hindrance, alkyl groups of 1 to 12 carbon atoms are particularly preferred.

Examples of the hydroxyl groups include hydroxyl groups bonded directly to the main chain of the polyanion, and hydroxyl groups bonded to the main chain via other functional groups. Examples of these other functional groups include alkyl groups of 1 to 7 carbon atoms, alkenyl groups of 2 to 7 carbon atoms, amide groups and imide groups and the like. The hydroxyl groups may be substituted at either the terminal of these functional groups, or at non-terminal positions within the functional groups. Of these groups, hydroxyl groups which are bonded to the terminal of alkyl groups of 1 to 6 carbon atoms bonded to the main chain are particularly preferred in terms of the resulting compatibility with resins and solubility within organic solvents.

Examples of the ester groups include alkyl ester groups or aromatic ester groups bonded directly to the main chain of the polyanion, and alkyl ester groups or aromatic ester groups bonded to the main chain via other functional groups.

Examples of the cyano groups include cyano groups bonded directly to the main chain of the polyanion, cyano groups bonded to the terminal of an alkyl group of 1 to 7 carbon atoms that is bonded to the main chain, and cyano groups bonded to the terminal of an alkenyl group of 2 to 7 carbon atoms that is bonded to the main chain.

As the anion groups of the polyanion, any functional groups that are capable of causing the chemical oxidative doping of the π-conjugated conductive polymer may be used, but of such functional groups, from the viewpoints of the ease and stability of manufacture, mono-substituted sulfate ester groups, mono-substituted phosphate ester groups, phosphoric acid groups, carboxyl groups and sulfo groups and the like are preferred. Moreover, in terms of the doping effect on the π-conjugated conductive polymer, sulfo groups, mono-substituted sulfate ester groups and carboxyl groups are particularly desirable.

Specific examples of the polyanion include polyvinyl sulfonic acid, polystyrene sulfonic acid, polyallyl sulfonic acid, polyethyl acrylate sulfonic acid, polybutyl acrylate sulfonic acid, polyacryl sulfonic acid, polymethacryl sulfonic acid, poly(2-acrylamide-2-methylpropane sulfonic acid), polyisoprene sulfonic acid, polyvinyl carboxylic acid, polystyrene carboxylic acid, polyallyl carboxylic acid, polyacryl carboxylic acid, polymethacryl carboxylic acid, poly(2-acrylamide-2-methylpropane carboxylic acid), polyisoprene carboxylic acid and polyacrylic acid and the like. The polyanion may be either a homopolymer of one of these polymers, or a copolymer of two or more of the above polymers.

Of these, polystyrene sulfonic acid, polyisoprene sulfonic acid, polyethyl acrylate sulfonic acid and polybutyl acrylate sulfonic acid are preferred. These polyanions enable greater increases in the conductivity of the resulting antistatic coating material, and are able to alleviate thermal decomposition of the π-conjugated conductive polymer.

The polymerization degree of the polyanion is preferably within a range from 10 to 100,000 monomer units, and from the viewpoints of solvent solubility and conductivity, is even more preferably within a range from 50 to 10,000 monomer units.

The quantity of the polyanion within the solid electrolyte layer 13 is preferably within a range from 0.1 to 10 mol, and even more preferably from 1 to 7 mol, per 1 mol of the π-conjugated conductive polymer. If the quantity of the polyanion is less than 0.1 mol, then the doping effect on the π-conjugated conductive polymer tends to weaken, and the resulting conductivity may be inadequate. Moreover, the dispersibility and solubility within solvents also tends to deteriorate, making it difficult to obtain a uniform dispersion. In contrast, if the quantity of the polyanion exceeds 10 mol, then the quantity of the π-conjugated conductive polymer within the solid electrolyte layer 13 is reduced, making it difficult to achieve a satisfactory degree of conductivity.

Further, the ratio between the π-conjugated conductive polymer and the polyanion within the conductive polymer solution is preferably such that per 100 parts by mass of the polyanion, the quantity of the π-conjugated conductive polymer is within a range from 1 to 1,000 parts by mass. If the quantity of the π-conjugated conductive polymer is less than 1 part by mass, then the conductivity tends to be insufficient, whereas if the quantity exceeds 1,000 parts by mass, the solvent solubility tends to be unsatisfactory.

<Amide Compound>

The amide compound is a monomolecular compound having an amide linkage represented by —CO—NH— (wherein the CO portion incorporates a double bond) within the molecule. In other words, examples of the amide compound include compounds that contain functional groups at both terminals of the above linkage, compounds in which a cyclic compound is bonded to one of the terminals of the above linkage, urea, in which the functional groups at both of the above terminals are hydrogen atoms, and urea derivatives.

Specific examples of the amide compound include acetamide, malonamide, succinamide, maleamide, fumaramide, benzamide, naphthamide, phthalamide, isophthalamide, terephthalamide, nicotinamide, isonicotinamide, 2-furamide, formamide, N-methylformamide, propionamide, propiolamide, butylamide, isobutylamide, methacrylamide, palmitamide, stearylamide, oleamide, oxamide, glutaramide, adipamide, cinnamamide, glucolamide, lactamide, glyceramide, tartaramide, citramide, glyoxylamide, acetoacetamide, dimethylacetamide, benzylamide, anthranylamide, ethylenediaminetetraacetamide, N-methylacrylamide, N,N-dimethylaminopropylacrylamide, isopropylacrylamide, N-hydroxyethylacrylamide, N-hydroxypropylacrylamide, N-hydroxybutylacrylamide, N-hydroxyethylacetamide, N-hydroxypropylamide, N-hydroxybutylacetamide, acetamidobenzoic acid and derivatives thereof, diacetamide, triacetamide, dibenzamide, tribenzamide, rhodanine, urea, 1-acetyl-2-thiourea, biuret, butylurea, dibutylurea, 1,3-dimethylurea, 1,3-diethylurea, and derivatives thereof.

In order to further enhance the conductivity of the solid electrolyte layer 13, the amide compound preferably contains one or more hydroxyl groups. Examples of amide compounds that contain one or more hydroxyl groups among the compounds exemplified above include N-hydroxyethylacrylamide, N-hydroxypropylacrylamide, N-hydroxybutylacrylamide, N-hydroxyethylacetamide, N-hydroxypropylamide and N-hydroxybutylacetamide. It is thought that if the amide compound contains a hydroxyl group, then hydrogen bonding strengthens the interaction with the π-conjugated conductive polymer and/or the polyanion, thereby further improving the conductivity.

Moreover, in terms of the film-forming properties, amide compounds that also contain a vinyl group and undergo polymerization, such as N-hydroxyethylacrylamide, N-hydroxypropylacrylamide and N-hydroxybutylacrylamide, are particularly desirable.

The molecular weight of the amide compound is preferably within a range from 46 to 10,000, is even more preferably from 46 to 5,000, and is most preferably from 46 to 1,000.

The quantity of the amide compound is preferably within a range from 1 to 5,000 parts by mass, and even more preferably from 50 to 500 parts by mass, per 100 parts by mass of the combination of the polyanion and the π-conjugated conductive polymer. If the quantity of the amide compound is less than 1 part by mass, then the conductivity and the heat resistance may be inadequate. Further, if the quantity of the amide compound exceeds 5,000 parts by mass, then the quantity of the π-conjugated conductive polymer within the solid electrolyte layer 13 is reduced, making it difficult to achieve a satisfactory degree of conductivity.

As the amide compound, a monomolecular compound containing an imide linkage (hereafter referred to as an imide compound) is preferred, as it yields a greater improvement in the conductivity. Examples of the imide compound, described in terms of the molecular skeleton, include phthalimide and phthalimide derivatives, succinimide and succinimide derivatives, benzimide and benzimide derivatives, maleimide and maleimide derivatives, and naphthalimide and naphthalimide derivatives.

Further, the imide compounds are classified as either aliphatic imides or aromatic imides or the like on the basis of the functional groups at the two terminals, and from the viewpoint of solubility, aliphatic imides are preferred.

Moreover, aliphatic imide compounds can be classified into saturated aliphatic imide compounds, which contain no unsaturated bonds between the carbon atoms within the molecule, and unsaturated aliphatic imide compounds, which contain unsaturated bonds between the carbon atoms within the molecule.

Saturated aliphatic imide compounds are compounds represented by the formula: $R^1$—CO—NH—CO—$R^2$, wherein $R^1$ and $R^2$ are both saturated hydrocarbon groups. Specific examples include cyclohexane-1,2-dicarboximide, allantoin, hydantoin, barbituric acid, alloxan, glutarimide, succinimide, 5-butylhydantoic acid, 5,5-dimethylhydantoin, 1-methylhydantoin, 1,5,5-trimethylhydantoin, 5-hydantoinacetic acid, N-hydroxy-5-norbornene-2,3-dicarboximide, semicarbazide, α,α-dimethyl-6-methylsuccinimide, bis[2-(succinimidooxycarbonyloxy)ethyl]sulfone, α-methyl-α-propylsuccinimide and cyclohexylimide.

Unsaturated aliphatic imide compounds are compounds represented by the formula: $R^1$—CO—NH—CO—$R^2$, wherein either one of, or both, $R^1$ and $R^2$ contain one or more unsaturated bonds. Specific examples include 1,3-dipropyleneurea, maleimide, N-methylmaleimide, N-ethylmaleimide, N-hydroxymaleimide, 1,4-bismaleimidobutane, 1,6-bismaleimidohexane, 1,8-bismaleimidooctane and N-carboxheptylmaleimide.

The molecular weight of the imide compound is preferably within a range from 60 to 5,000, even more preferably from 70 to 1,000, and is most preferably from 80 to 500.

The quantity of the amide compound is preferably within a range from 1 to 10,000 parts by mass, even more preferably from 1 to 5,000 parts by mass, and most preferably from 50 to 500 parts by mass, per 100 parts by mass of the combination of the polyanion and the π-conjugated conductive polymer. If the quantity of the amide compound is less than 1 part by mass, then the conductivity and the heat resistance may not improve. Further, if the quantity of the amide compound exceeds 10,000 parts by mass, then the quantity of the π-conjugated conductive polymer within the solid electrolyte layer 13 is reduced, making it difficult to achieve a satisfactory degree of conductivity.

<Compounds represented by Chemical Formula (1)>

Compounds represented by Chemical Formula (1) are included within the amide compound defined above, and are compounds that include both a vinyl group and an amide linkage (hereafter, a compound represented by Chemical Formula (1) may be referred to using the description "compound containing a vinyl group and an amide linkage").

In Chemical Formula (1), $R^1$ and $R^2$ each independently represent a hydrogen atom, or an alkyl group or an alkylene group that may be substituted.

Examples of the alkyl group include a methyl group, ethyl group, propyl group, n-butyl group and t-butyl group. Examples of the alkylene group include an ethylene group, propylene group and butylene group.

Specific examples include N-vinylacetamide, N-vinylpropionamide, N-vinylbutylamide, N-vinyl-isobutylamide, N-methyl-N-vinylacetamide, N-methyl-N-vinylpropionamide, N-methyl-N-vinylbutylamide, N-methyl-N-vinyl-isobutylamide, N-ethyl-N-vinylacetamide, N-ethyl-N-vinylpropionamide, N,N-divinylacetamide, N,N-divinylpropionamide, N-benzyl-N-vinylacetamide, N-benzyl-N-vinylpropionamide, N-(2-propyl)-N-vinylacetamide, and N-(2-propyl)-N-vinylpropionamide.

The quantity within the solid electrolyte layer 13 of the compound containing a vinyl group and an amide linkage is preferably within a range from 15 to 60% by mass. Provided the quantity of the compound containing a vinyl group and an amide linkage is at least 15% by mass, the conductivity of the solid electrolyte layer 13 can be further increased, and the ESR of the condenser 10 can be further reduced, whereas provided the quantity is not more than 60% by mass, the proportion of the π-conjugated conductive polymer can be maintained at a satisfactory level, meaning the conductivity can be increased, and the ESR of the condenser can be lowered even further.

<Ion-Conductive Polymer>

In order to increase the withstand voltage of the condenser, an ion-conductive polymer is preferably also included within the solid electrolyte layer 13. An ion-conductive polymer is a polymer having a repeating unit that includes an electron-donating region (a nucleophilic region), and exhibits ion conductivity when an organic salt or inorganic salt is added. Examples of the electron-donating region include a cyano group, amino group, amide group or imide group. Furthermore, amide linkages (—NH—CO—) and ether linkages (—O—) are also examples of electron-donating regions.

Of the various ion-conductive polymers, polymers represented by Chemical Formula (I) shown below are preferred, as they yield a superior improvement in the withstand voltage of the condenser 10.

$$X—(R—O)_n—Y \quad (I)$$

In the formula (I), R represents one or more moieties selected from the group consisting of substituted or unsubstituted alkylene groups, substituted or unsubstituted alkenylene groups, and substituted or unsubstituted phenylene groups.

X represents one or more moieties selected from the group consisting of a hydrogen atom, a hydroxyl group, substituted or unsubstituted alkyl groups, substituted or unsubstituted alkoxyl groups, substituted or unsubstituted alkenyl groups, and substituted or unsubstituted aryl groups.

Y represents one or more moieties selected from the group consisting of a hydrogen atom, substituted or unsubstituted alkyl groups, substituted or unsubstituted alkenyl groups, and substituted or unsubstituted aryl groups.

In those cases where X and/or Y is substituted with a substituent, examples of the substituent include an alkyl group, hydroxyl group, vinyl group, alkylaryl group, acryloyl group, amino group or amide group.

n represents an integer within a range from 2 to 2,000, and is preferably an integer from 3 to 1,000. If n is more than 2,000, then the compatibility of the ion-conductive polymer with the π-conjugated conductive polymer tends to deteriorate, and forming a uniform matrix becomes difficult.

Specific examples of the polymer represented by Chemical Formula (I) include diethylene glycol, triethylene glycol, oligopolyethylene glycol, triethylene glycol monochlorohydrin, diethylene glycol monochlorohydrin, oligoethylene glycol monochlorohydrin, triethylene glycol monobromohydrin, diethylene glycol monobromohydrin, oligoethylene glycol monobromohydrin, polyethylene glycol, glycidyl ethers, polyethylene glycol glycidyl ethers, polyethylene oxide, triethylene glycol dimethyl ether, tetraethylene glycol dimethyl ether, diethylene glycol dimethyl ether, diethylene glycol diethyl ether, diethylene glycol dibutyl ether, dipropylene glycol, tripropylene glycol, polypropylene glycol, polypropylene oxide, polyoxyethylene alkyl ethers, polyoxyethylene glycerol fatty acid esters, and polyoxyethylene fatty acid amides.

Specific examples of ion-conductive polymers other than the polymers represented by Chemical Formula (I) include polyvinylpyrrolidone which is formed from monomer units that contain an amide linkage, polyacrylamide, polyvinylacetamide, polyamide, polyimide and polyamic acid, which are formed from monomer units that contain an amide group, as well as polyacrylonitrile, polysilamine and polyvinyl alcohol.

The quantity of the ion-conductive polymer is preferably within a range from 1 to 10,000 parts by mass, and even more preferably from 50 to 1,500 parts by mass, per 100 parts by mass of the combination of the π-conjugated conductive polymer and the polyanion. If the quantity of the ion-conductive polymer is less than 1 part by mass, then the withstand voltage of the condenser 10 may not increase, whereas if the quantity exceeds 10,000 parts by mass, then the conductivity of the solid electrolyte layer 13 tends to deteriorate, and the ESR of the condenser 10 tends to increase.

The reason that including an ion-conductive polymer within the solid electrolyte layer 13 improves the withstand voltage of the condenser 10 is because the ion-conductive polymer within the solid electrolyte layer 13 adheres to, or is coordinated to, the metal oxide that constitutes the dielectric layer 12, thereby forming a layer of the ion-conductive polymer across a portion of the surface of the metal oxide. It is thought that this layer performs the role of a buffer, suppressing the speed of electrons or ions migrating between the electrodes under the influence of the electric field. It is surmised that by suppressing the migration speed of these electrons or ions, damage to the anode 11 or the cathode 14 caused by the impact of these electrons or ions can be prevented, thereby enabling the withstand voltage of the condenser 10 to be increased. Accordingly, by lowering the migration speed of the electrons or ions, damage to the anode 11 or the cathode 14 caused by the impact of these electrons or ions can be prevented, enabling the withstand voltage of the condenser 10 to be increased.

It is thought that defects within the dielectric layer 12 are oxidized and restored when an electric field is applied to the condenser 10. In the present invention, the ion-conductive polymer within the solid electrolyte layer 13 acts as an oxygen supply source during oxidation, and therefore enables ready restoration of the dielectric layer 12. It is thought that this is also a factor in improving the withstand voltage of the condenser 10.

<Conductivity Improvers>

In order to further enhance the conductivity, the solid electrolyte layer 13 preferably also includes a conductivity improver. The conductivity improver interacts with either the π-conjugated conductive polymer or the dopant for the π-conjugated conductive polymer, thereby improving the electrical conductance of the π-conjugated conductive polymer.

In order to achieve a superior improvement in the conductivity of the solid electrolyte layer 13, the conductivity improver is preferably one or more compounds selected from the group consisting of nitrogen-containing aromatic cyclic compounds, compounds containing two or more hydroxyl groups, compounds containing two or more carboxyl groups, compounds containing one or more hydroxyl groups and one or more carboxyl groups, aromatic compounds containing a sulfo group and a carboxyl group, compounds containing an amide group, compounds containing an imide group, lactam compounds, and compounds containing a glycidyl group.

Nitrogen-Containing Aromatic Cyclic Compounds

A nitrogen-containing aromatic compound is a compound having an aromatic ring that contains at least one nitrogen atom, in which the nitrogen atom within the aromatic ring has a conjugated relationship with another atom within the aromatic ring. In order to achieve this conjugated relationship, the nitrogen atom and the other atom form an unsaturated bond. Alternatively, the nitrogen atom may be positioned adjacent to another atom which forms part of an unsaturated bond, even if the nitrogen atom itself does not form an unsaturated bond directly with the other atom. This is because the unshared electron pair on the nitrogen atom is able to form a pseudo-conjugated relationship with the unsaturated bond formed between the other atoms.

The nitrogen-containing aromatic cyclic compound preferably includes both a nitrogen atom that has a conjugated relationship with another atom, and a nitrogen atom that is positioned adjacent to another atom which forms part of an unsaturated bond.

Examples of this type of nitrogen-containing aromatic cyclic compound include compounds containing a single nitrogen atom such as pyridines and derivatives thereof, compounds containing two nitrogen atoms such as imidazoles and derivatives thereof, pyrimidines and derivatives thereof, and pyrazines and derivatives thereof, and compounds containing three nitrogen atoms such as triazines and derivatives thereof. From the viewpoint of the solubility within solvents, pyridines and derivatives thereof, imidazoles and derivatives thereof, and pyrimidines and derivatives thereof are preferred.

Further, in the nitrogen-containing aromatic cyclic compound, a substituent such as an alkyl group, hydroxyl group, carboxyl group, cyano group, phenyl group, phenol group, ester group, alkoxy group or carbonyl group may be introduced into the ring, or an unsubstituted compound may be used. Furthermore, the ring may also be a polycyclic structure.

Specific examples of the pyridines and derivatives thereof include pyridine, 2-methylpyridine, 3-methylpyridine, 4-methylpyridine, 4-ethylpyridine, N-vinylpyridine, 2,4-dimethylpyridine, 2,4,6-trimethylpyridine, 3-cyano-5-methylpyridine, 2-pyridinecarboxylic acid, 6-methyl-2-pyridinecarboxylic acid, 4-pyridinecarboxyaldehyde, 4-aminopyridine, 2,3-diaminopyridine, 2,6-diaminopyridine, 2,6-diamino-4-methylpyridine, 4-hydroxypyridine, 4-pyridinemethanol, 2,6-dihydroxypyridine, 2,6-pyridinedimethanol, methyl 6-hydroxynicotinate, 2-hydroxy-5-pyridinemethanol, ethyl 6-hydroxynicotinate, 4-pyridinemethanol, 4-pyridineethanol, 2-phenylpyridine, 3-methylquinoline, 3-ethylquinoline, quinolinol, 2,3-cyclopentenopyridine, 2,3-cyclohexanopyridine, 1,2-di(4-pyridyl)ethane, 1,2-di(4-pyridyl)propane, 2-pyridinecarboxyaldehyde, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid, and 3-pyridinesulfonic acid.

Specific examples of the imidazoles and derivatives thereof include imidazole, 2-methylimidazole, 2-propylimidazole, 2-undecylimidazole, 2-phenylimidazole, N-methylimidazole, N-vinylimidazole, N-allylimidazole, 1-(2-hydroxyethyl)imidazole, 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, dimethyl 4,5-imidazoledicarboxylate, benzimidazole, 2-aminobenzimidazole, 2-aminobenzimidazole-2-sulfonic acid, 2-amino-1-methylbenzimidazole, 2-hydroxybenzimidazole, and 2-(2-pyridyl)benzimidazole.

Specific examples of the pyrimidines and derivatives thereof include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine, and 2,4-pyrimidinediol.

Examples of the pyrazines and derivatives thereof include pyrazine, 2-methylpyrazine, 2,5-dimethylpyrazine, pyrazinecarboxylic acid, 2,3-pyrazinedicarboxylic acid, 5-methylpyrazinecarboxylic acid, pyrazinamide, 5-methylpyrazinamide, 2-cyanopyrazine, aminopyrazine, 3-aminopyrazine-2-carboxylic acid, 2-ethyl-3-methylpyrazine, 2,3-dimethylpyrazine, and 2,3-diethylpyrazine.

Specific examples of the triazines and derivatives thereof include 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluoromethyl)-1,3,5-triazine, 2,4,6-tri-2-pyridyl-1,3,5-triazine, 3-(2-pyridyl)-5,6-bis(4-phenylsulfonic acid)-1,2,4-triazine disodium, 3-(2-pyridyl)-5,6-diphenyl-1,2,4-triazine, 3-(2-pyridyl)-5,6-diphenyl-1,2,4-triazine-ρ,ρ'-disulfonic acid disodium, and 2-hydroxy-4,6-dichloro-1,3,5-triazine.

Because the nitrogen atom in the nitrogen-containing aromatic cyclic compound contains an unshared electron pair, a substituent or a proton can readily coordinate or bond to the nitrogen atom. When a substituent or a proton coordinates or bonds to the nitrogen atom, the nitrogen atom tends to adopt a cationic charge. Because the nitrogen and another atom are conjugated, the cationic charge produced by the substituent or proton coordinated or bonded to the nitrogen atom is dispersed throughout the nitrogen-containing aromatic ring, and exists in a stable manner.

For this reason, the nitrogen-containing aromatic cyclic compound may form a nitrogen-containing aromatic cyclic compound cation with a substituent introduced at the nitrogen atom. Further, the cation and an anion may be combined to form a salt. Even in the form of a salt, the same effect is achieved as that provided by a non-cationic form of the nitrogen-containing aromatic cyclic compound.

Examples of the substituent that can be introduced at the nitrogen atom of the nitrogen-containing aromatic cyclic compound include a hydrogen atom, or an alkyl group, hydroxyl group, carboxyl group, cyano group, phenyl group, phenol group, ester group, alkoxyl group, or carbonyl group. The same substituents as those described above can be used.

The quantity of the nitrogen-containing aromatic cyclic compound is preferably within a range from 0.1 to 100 mol, and even more preferably from 0.5 to 30 mol, per 1 mol of anionic group units within the polyanion. From the viewpoint of the physical properties and conductivity of the solid electrolyte layer 13 (the conductive coating), this quantity is most preferably within a range from 1 to 10 mol. If the quantity of the nitrogen-containing aromatic cyclic compound is less than 0.1 mol, then the interaction between the nitrogen-containing aromatic cyclic compound and the polyanion and π-conjugated conductive polymer tends to weaken, and the resulting conductivity may be inadequate. In contrast, if the quantity of the nitrogen-containing aromatic cyclic compound exceeds 100 mol, then the quantity of the π-conjugated conductive polymer is reduced, which makes it difficult to achieve a satisfactory degree of conductivity, and may alter the physical properties of the solid electrolyte layer 13.

Compounds Containing Two or More Hydroxyl Groups

Examples of the compounds containing two or more hydroxyl groups include: polyhydric aliphatic alcohols such as ethylene glycol, diethylene glycol, triethylene glycol, propylene glycol, dipropylene glycol, 1,3-butylene glycol, 1,4-butylene glycol, glycerol, diglycerol, D-glucose, D-glucitol, isoprene glycol, dimethylolpropionic acid, butanediol, 1,5-pentanediol, 1,6-hexanediol, 1,9-nonanediol, neopentyl glycol, trimethylolethane, trimethylolpropane, pentaerythritol, dipentaerythritol, thiodiethanol, glucose, polyethylene glycol, polypropylene glycol, tartaric acid, D-glucaric acid, and glutaconic acid;

polymer alcohols such as polyvinyl alcohol, cellulose, polysaccharides, and sugar alcohols; and aromatic compounds such as 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenylsulfone, 2,2',5,5'-tetrahydroxydiphenylsulfone, 3,3',5,5'-tetramethyl-4,4'-dihydroxydiphenylsulfone, hydroxyquinonecarboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinonesulfonic acid and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, phenyl 1,4-dihydroxy-2-naphthoate, 4,5-dihydroxynaphthalene-2,7-disulfonic acid and salts thereof, 1,8-dihydroxy-3,6-naphthalenedisulfonic acid and salts thereof, 6,7-dihydroxy-2-naphthalenesulfonic acid and salts thereof, 1,2,3-trihydroxybenzene (pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzaldehyde, trihydroxyanthraquinone, 2,4,6-trihydroxybenzene, tetrahydroxy-p-benzoquinone, tetrahydroxyanthraquinone, methyl gallate, ethyl gallate, and potassium hydroxysulfonate.

The quantity of the compound containing two or more hydroxyl groups is preferably within a range from 0.05 to 50 mol, and even more preferably from 0.3 to 10 mol, per 1 mol of anionic group units within the polyanion. If the quantity of the compound containing two or more hydroxyl groups is less than 0.05 mol per 1 mol of anionic group units within the polyanion, then the resulting conductivity and heat resistance may be inadequate. In contrast, if the quantity of the compound containing two or more hydroxyl groups exceeds 50 mol per 1 mol of anionic group units within the polyanion, then the quantity of the π-conjugated conductive polymer within the solid electrolyte layer 13 (the conductive coating) is reduced, which makes it difficult to achieve a satisfactory degree of conductivity, and may alter the physical properties of the solid electrolyte layer 13.

In those cases where a compound containing two or more hydroxyl groups is included as a conductivity improver, the conductivity and heat resistance of the solid electrolyte layer 13 (the conductive coating) can be better enhanced for the following reasons. Namely, because the π-conjugated conductive polymer within the solid electrolyte layer 13 (the conductive polymer solution) is in a state of high-level oxidation, heat and the like can readily cause oxidative degradation of a portion of the π-conjugated conductive polymer. As a result, it is thought that radicals are generated, and degradation can then proceed via radical chain formation. However, it is surmised that the compound containing two or more hydroxyl groups is able to trap these radicals via the hydroxyl groups, thereby blocking the formation of radical chains, inhibiting any degradation, and improving the conductivity and heat resistance.

—Compounds Containing Two or More Carboxyl Groups

Examples of the compound containing two or more carboxyl groups include aliphatic carboxylic acid compounds such as maleic acid, fumaric acid, itaconic acid, citraconic acid, malonic acid, 1,4-butanedicarboxylic acid, succinic acid, tartaric acid, adipic acid, D-glucaric acid, glutaconic acid, and citric acid;

aromatic carboxylic acid compounds containing at least one carboxyl group bonded to an aromatic ring, such as phthalic acid, terephthalic acid, isophthalic acid, tetrahydrophthalic anhydride, 5-sulfoisophthalic acid, 5-hydroxyisophthalic acid, methyltetrahydrophthalic anhydride, 4,4'-oxydiphthalic acid, biphenyltetracarboxylic dianhydride, benzophenonetetracarboxylic dianhydride, naphthalenedicarboxylic acid, trimellitic acid, and pyromellitic acid; as well as diglycolic acid, oxydibutyric acid, thiodiacetic acid, thiodibutyric acid, iminodiacetic acid, and ininobutyric acid.

The quantity of the compound containing two or more carboxyl groups is preferably within a range from 0.1 to 30 mol, and even more preferably from 0.3 to 10 mol, per 1 mol of anionic group units within the polyanion. If the quantity of the compound containing two or more carboxyl groups is less than 0.1 mol per 1 mol of anionic group units within the polyanion, then the resulting conductivity and heat resistance may be inadequate. In contrast, if the quantity of the compound containing two or more carboxyl groups exceeds 30 mol per 1 mol of anionic group units within the polyanion, then the quantity of the π-conjugated conductive polymer within the solid electrolyte layer 13 (the conductive coating) is reduced, which makes it difficult to achieve a satisfactory degree of conductivity, and may alter the physical properties of the solid electrolyte layer 13.

—Compounds Containing One or More Hydroxyl Groups and One or More Carboxyl Groups Examples of the compound containing one or more hydroxyl groups and one or more carboxyl groups include tartaric acid, glyceric acid, dimethylolbutanoic acid, dimethylolpropanoic acid, D-glucaric acid, and glutaconic acid.

The quantity of the compound containing one or more hydroxyl groups and one or more carboxyl groups is preferably within a range from 1 to 5,000 parts by mass, and even more preferably from 50 to 500 parts by mass, per 100 parts by mass of the combination of the polyanion and the π-conjugated conductive polymer. If the quantity of the compound containing one or more hydroxyl groups and one or more carboxyl groups is less than 1 part by mass, then the resulting conductivity and heat resistance may be inadequate. In contrast, if the quantity of the compound containing one or more hydroxyl groups and one or more carboxyl groups exceeds 5,000 parts by mass, then the quantity of the π-conjugated conductive polymer within the solid electrolyte layer 13 (the conductive coating) is reduced, making it difficult to achieve a satisfactory degree of conductivity.

—Aromatic Compounds Containing a Sulfo Group and a Carboxyl Group

The aromatic compound containing a sulfo group and a carboxyl group is a compound in which an aromatic ring such as a benzene or naphthalene ring has been substituted with a sulfo group and a carboxyl group, and examples include 2-sulfobenzoic acid and salts thereof, 3-sulfobenzoic acid and salts thereof, 3,5-disulfobenzoic acid and salts thereof, 4-sulfophthalic acid and salts thereof, 5-sulfoisophthalic acid and salts thereof, dimethyl 5-sulfoisophthalate ester and salts thereof, 2-sulfoterephthalic acid and salts thereof, 5-sulfosalicylic acid and salts thereof, 4-sulfonaphthalene-1,8-dicarboxylic acid, 4-sulfonaphthalene-2,7-dicarboxylic acid, 5-sulfonaphthalene-1,4-dicarboxylic acid, and 3-hydroxy-4-(2-hydroxy-4-sulfo-1-naphthylazo)naphthalene-2-carboxylic acid.

The quantity of the aromatic compound containing a sulfo group and a carboxyl group is preferably within a range from 10 to 10,000 parts by mass, and even more preferably from 50 to 5,000 parts by mass, per 100 parts by mass of the combination of the π-conjugated conductive polymer and the polyanion. If the quantity added of the aromatic compound containing a sulfo group and a carboxyl group is less than the lower limit of the above range, then the effect achieved by adding the aromatic compound containing a sulfo group and a carboxyl group tends to diminish, which is undesirable. In contrast, if the quantity exceeds the upper limit of the above range, then the conductivity tends to decrease as a result of the reduction in the concentration of the π-conjugated conductive polymer, which is also undesirable.

—Lactam Compounds

A lactam compound is an intramolecular cyclic amide of an aminocarboxylic acid, and is a compound in which a portion of the ring can be represented by —CO—NR-(wherein R is a hydrogen atom or an arbitrary substituent). One or more of the carbon atoms within the ring may be unsaturated or substituted for a hetero atom.

Examples of the lactam compound include pentano-4-lactam, 4-pentanelactam-5-methyl-2-pyrrolidone, 5-methyl-2-pyrrolidinone, hexano-6-lactam, and 6-hexanelactam.

The quantity of the lactam compound is preferably within a range from 10 to 10,000 parts by mass, and even more preferably from 50 to 5,000 parts by mass, per 100 parts by mass of the combination of the π-conjugated conductive polymer and the polyanion. If the quantity added of the lactam compound is less than the lower limit of the above range, then the effect achieved by adding the lactam compound tends to diminish, which is undesirable. In contrast, if the quantity exceeds the upper limit of the above range, then the conductivity tends to decrease as a result of the reduction in the concentration of the π-conjugated conductive polymer, which is also undesirable.

—Compounds Containing a Glycidyl Group

Examples of the compound containing a glycidyl group include glycidyl compounds such as ethyl glycidyl ether, butyl glycidyl ether, t-butyl glycidyl ether, allyl glycidyl ether, benzyl glycidyl ether, glycidyl phenyl ether, bisphenol A diglycidyl ether, glycidyl acrylate, and glycidyl methacrylate.

The quantity of the compound containing a glycidyl group is preferably within a range from 10 to 10,000 parts by mass, and even more preferably from 50 to 5,000 parts by mass, per 100 parts by mass of the combination of the π-conjugated conductive polymer and the polyanion. If the quantity added of the compound containing a glycidyl group is less than the lower limit of the above range, then the effect achieved by adding the compound containing a glycidyl group tends to diminish, which is undesirable. In contrast, if the quantity exceeds the upper limit of the above range, then the conductivity tends to decrease as a result of the reduction in the concentration of the π-conjugated conductive polymer, which is also undesirable.

(Alkaline Compound)

As the alkaline compound, conventional inorganic alkali compounds or organic alkali compounds can be used. Examples of inorganic alkali compounds include sodium hydroxide, potassium hydroxide, calcium hydroxide and ammonia.

As the organic alkali compound, nitrogen-containing aromatic cyclic compounds (aromatic amines), aliphatic amines, and metal alkoxides and the like can be used favorably.

Specific examples of the nitrogen-containing aromatic cyclic compounds include the compounds exemplified above.

Examples of the aliphatic amine compounds include ethylamine, n-octylamine, diethylamine, diisobutylamine, methylethylamine, trimethylamine, triethylamine, allylamine, 2-ethylaminoethanol, 2,2'-iminodiethanol, and N-ethylethylenediamine.

Examples of the metal alkoxides include sodium alkoxides such as sodium methoxide and sodium ethoxide, as well as potassium alkoxides and calcium alkoxides.

Of these alkaline compounds, nitrogen-containing aromatic cyclic compounds are preferred. This is because nitrogen-containing aromatic cyclic compounds not only prevent de-doping of the polyanion, but also enable a superior improvement in the conductivity.

The pH (25° C.) of the conductive polymer solution is preferably adjusted by the alkaline compound to a value within a range from 3 to 13, and even more preferably from 5 to 11. Provided the pH of the conductive polymer solution is at least 3, the corrosive properties are able to be suppressed. However, if the pH exceeds 13, then the conductivity of the π-conjugated conductive polymer tends to deteriorate, which is undesirable.

—Organic Solvent

Furthermore, if a portion of the organic solvent remains within the solid electrolyte layer 13, it can also function as a conductivity improver. Examples of organic solvents that can function as a conductivity improver include polar solvents such as N-methyl-2-pyrrolidone, N,N-dimethylformamide, N,N-dimethylacetamide, dimethylsulfoxide, hexamethylenephosphortriamide, N-vinylpyrrolidone, N-vinylformamide and N-vinylacetamide; phenols such as cresol, phenol and xylenol; polyhydric aliphatic alcohols such as ethylene glycol, diethylene glycol, triethylene glycol, propylene glycol, dipropylene glycol, 1,3-butylene glycol, 1,4-butylene glycol, glycerol, diglycerol, D-glucose, D-glucitol, isoprene glycol, butanediol, 1,5-pentanediol, 1,6-hexanediol, 1,9-nonanediol, and neopentyl glycol; carbonate compounds such as ethylene carbonate and propylene carbonate; ether compounds such as dioxane and diethyl ether; chain-like ethers such as dialkyl ethers, propylene glycol dialkyl ethers, polyethylene glycol dialkyl ethers, and polypropylene glycol dialkyl ethers; heterocyclic compounds such as 3-methyl-2-oxazolidinone; and nitrile compounds such as acetonitrile, glutarodinitrile, methoxyacetonitrile, propionitrile, and benzonitrile. These solvents may be used either alone, or as mixtures containing two or more different solvents.

The quantity of the organic solvent is preferably within a range from 10 to 100,000 parts by mass, and even more preferably from 50 to 10,000 parts by mass, per 100 parts by mass of the combination of the π-conjugated conductive polymer and the polyanion.

These types of conductivity improvers are able to bring molecules of the π-conjugated conductive polymer closer together, either by forming hydrogen bonds between the polyanion and the π-conjugated conductive polymer, or by generating interactions between individual molecules of these compounds. It is thought that, as a result, the energy required for the electrical conductance phenomenon known as hopping to occur between molecules of the π-conjugated conductive polymer is reduced, thereby reducing the overall electrical resistance and improving the conductivity.

<Silane Coupling Agent>

The silane coupling agent is a compound represented by Chemical Formula (I) shown below.

   Chemical Formula (I)

In the formula (I), X represents an alkoxyl group or a halogen atom. Examples of the alkoxy group include a methoxy group, ethoxy group, propoxy group or butoxy group. Examples of the halogen atom include a fluorine atom, chlorine atom, bromine atom or iodine atom.

Y represents one or more groups selected from the group consisting of substituted or unsubstituted vinyl groups, epoxy groups, styryl groups, methacryloxy groups, acryloxy groups, amino groups, ureido groups, chloropropyl groups, mercapto groups, sulfide groups and isocyanate groups.

Specific examples of the silane coupling agent include vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltriethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, and 3-isocyanatopropyltriethoxysilane.

The quantity of the silane coupling agent is preferably within a range from 1 to 10,000 parts by mass, and even more preferably from 50 to 1,500 parts by mass, per 100 parts by mass of the combined mass of the π-conjugated conductive polymer and the polyanion. If the quantity of the silane coupling agent is less than 1 part by mass per 100 parts by mass of the combined mass of the 1-conjugated conductive polymer and the polyanion, then the withstand voltage may not be able to be increased, whereas if the quantity exceeds 10,000 parts by mass, the conductivity may decrease and the ESR may increase.

<Dopant>

In order to further improve the conductivity of the 1-conjugated conductive polymer, the solid electrolyte layer 13 (the conductive polymer solution) may also include other dopants other than the polyanion.

As these other dopants, halogen compounds, Lewis acids, protic acids, alkaline earth metals and quaternary amine compounds and the like can be used, and specific examples include organic acids such as organic carboxylic acids and organic sulfonic acids, as well as organic cyano compounds, fullerene, fullerene hydride, fullerene hydroxide, fullerene carboxylate and fullerene sulfonate and the like.

The quantity of the dopant compound is preferably within a range from 10 to 10,000 molar parts, and even more preferably from 30 to 3,000 molar parts, per 100 molar parts of the π-conjugated conductive polymer. If the quantity added of the dopant compound is less than the lower limit of the above range, then the effect achieved by adding the dopant compound tends to diminish, which is undesirable. In contrast, if the quantity exceeds the upper limit of the above range, then the conductivity tends to decrease as a result of the reduction in the concentration of the π-conjugated conductive polymer, which is also undesirable.

Specific examples of the organic acids include organic sulfonic acid compounds such as alkylbenzenesulfonic acids, alkylnaphthalenesulfonic acids, alkylnaphthalenedisulfonic acids, naphthalenesulfonic acid-formalin polycondensates, melaminesulfonic acid-formalin polycondensates, naphthalenedisulfonic acid, naphthalenetrisulfonic acid, dinaphthylmethanedisulfonic acid, anthraquinonesulfonic acid, anthraquinonedisulfonic acid, anthracenesulfonic acid and pyrenesulfonic acid; and organic carboxylic acid compounds such as acetic acid, oxalic acid, benzoic acid, phthalic acid, maleic acid, fumaric acid, and malonic acid. Further, metal salts of these organic acids may also be used.

As the organic cyano compound, compounds having two or more cyano groups bonded to conjugated bonds can be used. Specific examples include tetracyanoethylene, tetracyanoethylene oxide, tetracyanobenzene, dichlorodicyanobenzoquinone (DDQ), tetracyanoquinodimethane, and tetracyanoazanaphthalene.

<Binder Resin>

In order to regulate the film-forming properties and film strength and the like, the solid electrolyte layer 13 (the conductive polymer solution) may also include a binder resin.

There are no particular restrictions on the binder resin, provided it is compatible with, or mixable and dispersible within, the π-conjugated conductive polymer or the polyanion, and either thermosetting resins or thermoplastic resins may be used. Examples of the binder resin include polyesters such as polyethylene terephthalate, polybutylene terephthalate and polyethylene naphthalate, polyimides such as polyimide and polyamideimide, polyamides such as polyamide 6, polyamide 66, polyamide 12 and polyamide 11, fluororesins such as polyvinylidene fluoride, polyvinyl fluoride, polytetrafluoroethylene, ethylene-tetrafluoroethylene copolymer, and polychlorotrifluoroethylene, vinyl resins such as polyvinyl alcohol, polyvinyl ether, polyvinyl butyral, polyvinyl acetate and polyvinyl chloride, as well as epoxy resins, xylene resins, aramid resins, polyurethane, polyurea, melamine resins, phenolic resins, polyethers, acrylic-based resins, and copolymers thereof.

The quantity of the binder resin is preferably within a range from 1 to 50,000 parts by mass, and even more preferably from 10 to 1,000 parts by mass, per 100 parts by mass of the combination of the π-conjugated conductive polymer and the polyanion. If the quantity added of the binder resin is less than the lower limit of the above range, then the effect achieved by adding the binder resin tends to diminish, which is undesirable. In contrast, if the quantity exceeds the upper limit of the above range, then the conductivity tends to decrease as a result of the reduction in the concentration of the π-conjugated conductive polymer, which is also undesirable.

Furthermore, instead of adding an aforementioned binder resin, a precursor compound or monomer that gives rise to a binder resin may be added to the conductive polymer solution. The binder resin can then be formed by polymerizing the precursor compound or monomer.

(Cathode)

The cathode 14 is formed, for example, from a layer of carbon, silver or aluminum or the like. In those cases where the cathode 14 is formed from carbon or silver or the like, it can be formed from a conductive paste containing a conductor such as carbon or silver. Further, in those cases where the cathode 14 is formed from aluminum, it may be formed using an aluminum foil.

In the condenser 10, a separator may be provided between the dielectric layer 12 and the solid electrolyte layer 13 as required.

Because it contains an amide compound, the solid electrolyte layer 13 used in forming the condenser 10 has a high degree of conductivity. As a result, the ESR of the condenser 10 can be lowered. Further, it is thought that in those cases where the amide compound is a compound containing a vinyl group and an amide linkage, interaction in the solid electrolyte layer 13 between the compound containing a vinyl group and an amide linkage and the anionic groups within the polyanion is facilitated, and this interaction enables molecules of the polyanion to be drawn closer together. As a result, molecules of the π-conjugated conductive polymer, which are adsorbed to the polyanion by doping, are also drawn closer together. It is surmised that this enables a reduction in the energy required for the electrical conductance phenomenon known as hopping to occur between molecules of the π-conjugated conductive polymer, thereby increasing the conductivity. By increasing the conductivity of the solid electrolyte layer 13, the ESR of the condenser 10 can be reduced. Further, it is thought that the heat resistance also improves as a result of drawing the molecules of the π-conjugated conductive polymer closer together.

In those cases where the solid electrolyte layer 13 of the condenser 10 includes a silane coupling agent, the solid electrolyte layer 13 can be bonded strongly to the dielectric layer 12. As a result, defects are less likely to develop within the dielectric layer 12, and the withstand voltage of the condenser 10 can be increased even if the thickness of the dielectric layer 12 is reduced. In addition, even though the solid electrolyte layer 13 includes the polyanion and silane coupling agent that exhibit no conductivity, because the layer also includes a conductivity improver, the conductivity is comparatively high, meaning the ESR of the condenser 10 is at a level that is low enough to enable practical application. Moreover, the condenser 10 also has a satisfactory capacitance.

In those cases where the condenser 10 includes, between the dielectric layer 12 and the solid electrolyte layer 13, an intermediate layer 16 that contains a low-thermal expansion polymer and has a coefficient of thermal expansion that is little different from the coefficient of thermal expansion for the dielectric layer 12, when the structure is exposed to thermal stress during manufacture of the condenser, the intermediate layer 16 expands at substantially the same rate as the dielectric layer 12. As a result, even if exposed to thermal stress, defects are unlikely to develop within the intermediate layer 16, and shorting between the anode 11 and the solid electrolyte layer 13 can be prevented.

(Process for Manufacturing Conductive Polymer Solution)

Next is a description of an example of a process for manufacturing the conductive polymer solution.

In this process for manufacturing the conductive polymer solution, first, a precursor monomer that forms the π-conjugated conductive polymer is subjected to a chemical oxidative polymerization within a solvent and in the presence of the polyanion, thereby forming a complex between the π-conjugated conductive polymer and the polyanion.

Subsequently, the conductivity improver and the alkaline compound are added to the solution containing the complex, thus forming the conductive polymer solution. There are no particular restrictions on the order in which the conductivity improver and the alkaline compound are added, and either may be added first. Furthermore, an additional quantity of the solvent may also be added afterwards.

The conductivity improver included within the above conductive polymer solution is able to bring molecules of the π-conjugated conductive polymer closer together, either by forming hydrogen bonds between the polyanion and the π-conjugated conductive polymer, or by generating interactions between individual molecules of these compounds. It is thought that, as a result, the energy required for the electrical conductance phenomenon known as hopping to occur between molecules of the π-conjugated conductive polymer is reduced, thereby reducing the overall electrical resistance and improving the conductivity. Furthermore, because the conductive polymer solution also includes an alkaline compound, the acidity is reduced, thereby reducing the corrosive properties.

<Conductive Coating>

A conductive coating of the present invention is formed by applying, and then drying, the conductive polymer solution described above.

Examples of the method used for applying the conductive polymer solution include conventional coating, dipping and spraying techniques.

Examples of the coating target object to which the conductive polymer solution is applied include a glass plate, plastic film, metal layer, or metal oxide layer.

Examples of the method used for drying the conductive polymer solution following application include drying methods such as blow drying at room temperature, or drying using a hot air dryer or far infrared dryer. From the viewpoint of improving the film formation efficiency, a method that uses a hot air dryer or far infrared dryer or the like is preferred. By using this type of drying method, the volatile component within the conductive polymer solution is removed, yielding a conductive coating.

Because the conductive coating described above is formed by applying, and then drying, the conductive polymer solution described above, the coating exhibits a high degree of conductivity and minimal corrosive properties.

<Process for Manufacturing Condenser>

Next is a description of a process for manufacturing the condenser 10.

In a process for manufacturing the condenser 10 according to one embodiment of the present invention, a conductive polymer solution is first applied and adhered to the surface of a dielectric layer 12 of a condenser intermediate having an anode 11 and a dielectric layer 12 composed of an oxide film formed by oxidizing the surface of the anode 11. The conductive polymer solution used in this step contains, as essential components, the π-conjugated conductive polymer, the polyanion, either an amide compound or a combination of a conductivity improver and a silane coupling agent, and a solvent.

Furthermore, in a process for manufacturing the condenser 10 according to another embodiment of the present invention, a low-thermal expansion polymer solution is applied to the surface of the dielectric layer 12 to form an intermediate layer 16, and a conductive polymer solution is then applied to the surface of the intermediate layer 16 to form the solid electrolyte layer 13. The low-thermal expansion polymer solution used in forming the intermediate layer 16 is prepared by dissolving a low-thermal expansion polymer described above in a solvent. The concentration of the low-thermal expansion polymer solution is preferably within a range from 0.01 to 5% by mass, and is even more preferably from 0.01 to 0.5% by mass. Examples of the method used for applying the low-thermal expansion polymer solution include conventional coating, dipping and spraying techniques. As the drying method, conventional techniques such as hot air drying may be used.

There are no particular restrictions on the solvent used, and examples include water and/or an organic solvent. In terms of ensuring a higher level of conductivity for the resulting conductive coating, a solvent composed of water and an organic solvent is preferred. In other words, the organic solvents listed below may improve the conductivity.

Specific examples of the organic solvent include polar solvents such as N-methyl-2-pyrrolidone, N,N-dimethylformamide, N,N-dimethylacetamide, dimethylsulfoxide, hexamethylenephosphortriamide, N-vinylpyrrolidone, N-vinylformamide and N-vinylacetamide; phenols such as cresol, phenol and xylenol; polyhydric aliphatic alcohols such as ethylene glycol, diethylene glycol, triethylene glycol, propylene glycol, dipropylene glycol, 1,3-butylene glycol, 1,4-butylene glycol, glycerol, diglycerol, D-glucose, D-glucitol, isoprene glycol, butanediol, 1,5-pentanediol, 1,6-hexanediol, 1,9-nonanediol, and neopentyl glycol; ketones such as acetone and methyl ethyl ketone; hydrocarbons such as hexane, benzene and toluene; carboxylic acids such as formic acid and acetic acid; carbonate compounds such as ethylene carbonate and propylene carbonate; ether compounds such as dioxane, diethyl ether, triethylene glycol dimethyl ether, tetraethylene glycol dimethyl ether, diethylene glycol dimethyl ether, diethylene glycol diethyl ether, and diethylene glycol dibutyl ether; chain-like ether compounds such as dialkyl ethers, propylene glycol dialkyl ethers, polyethylene glycol dialkyl ethers, and polypropylene glycol dialkyl ethers; heterocyclic compounds such as 3-methyl-2-oxazolidinone; and nitrile compounds such as acetonitrile, glutarodinitrile, methoxyacetonitrile, propionitrile, and benzonitrile. These solvents may be used either alone, or as mixtures containing two or more different solvents.

Of these, from the viewpoint of simplifying the process, alcohol-based solvents having a low boiling point, and environmentally friendly water are preferred.

Moreover, in terms of ensuring a superior improvement in the conductivity and facilitating ready control of the drying rate, a mixed solvent of water and an organic solvent having a boiling point of 100° C. or higher at a pressure of 0.1 MPa is particularly desirable.

Examples of the organic solvent having a boiling point of 100° C. or higher at a pressure of 0.1 MPa, selected from the solvents exemplified above, include polar solvents such as N-methyl-2-pyrrolidone, N,N-dimethylformamide, N,N-dimethylacetamide, dimethylsulfoxide, hexamethylenephosphortriamide, N-vinylpyrrolidone, N-vinylformamide and N-vinylacetamide; and polyhydric alcohols such as ethylene glycol, diethylene glycol, triethylene glycol, propylene glycol, dipropylene glycol, 1,3-butylene glycol, 1,4-butylene glycol, glycerol, diglycerol, D-glucose, D-glucitol, isoprene glycol, butanediol, 1,5-pentanediol, 1,6-hexanediol, 1,9-nonanediol, and neopentyl glycol. These solvents may be used either alone, or as mixtures containing two or more different solvents.

The quantity of the organic solvent is preferably within a range from 1 to 10,000 parts by mass, and even more preferably from 50 to 3,000 parts by mass, per 100 parts by mass of the combination of the polyanion and the 1-conjugated conductive polymer.

If required, other additives may be added to the conductive polymer solution to improve properties such as the coating properties and stability of the conductive polymer solution, the adhesiveness of the solution to substrates, and the properties of the generated solid electrolyte layer 13 (the conductive coating). There are no particular restrictions on these additives, provided they are able to be mixed with the π-conjugated conductive polymer and the polyanion, and examples of additives that can be used include surfactants, antifoaming agents, coupling agents, and antioxidants.

Examples of the surfactants include anionic surfactants such as carboxylates, sulfonates, sulfates and phosphates; cationic surfactants such as amine salts and quaternary ammonium salts; amphoteric surfactants such as carboxybetaines, aminocarboxylates, and imidazolium betaines; and non-ionic surfactants such as polyoxyethylene alkyl ethers, polyoxyethylene glycerol fatty acid esters, ethylene glycol fatty acid esters, and polyoxyethylene fatty acid amides.

Examples of the antifoaming agents include silicone resins, polydimethylsiloxane, and silicone resins.

Examples of the coupling agents include silane coupling agents having a vinyl group, amino group, epoxy group or methacryl group.

Examples of the antioxidants include phenol-based antioxidants, amine-based antioxidants, phosphorus-based antioxidants, sulfur-based antioxidants, sugars, and vitamins.

The conductive polymer solution preferably has a pH at 25° C. within a range from 3 to 13, and even more preferably from 5 to 11. Provided the pH of the conductive polymer solution is at least 3, corrosion of the dielectric layer 12 caused by the conductive polymer solution is able to be prevented. However, if the pH exceeds 13, then the conductivity of the π-conjugated conductive polymer tends to deteriorate, which is undesirable.

An alkaline compound may be added to ensure that the pH of the conductive polymer solution is within the range from 3 to 13. As the alkaline compound, conventional inorganic alkali compounds or organic alkali compounds can be used.

Examples of inorganic alkali compounds include sodium hydroxide, potassium hydroxide, calcium hydroxide and ammonia.

As the organic alkali compound, nitrogen-containing aromatic cyclic compounds (aromatic amines), aliphatic amines, and metal alkoxides and the like can be used favorably.

Examples of the nitrogen-containing aromatic cyclic compounds include the compounds exemplified above.

Examples of the aliphatic amine compounds include aliphatic amines such as dimethylamine and diethylamine, aromatic amine compounds such as imidazole, 2-methylimidazole, 1-hydroxyethylimidazole, 2,6-pyridinedimethanol, and 2-pyridinecarboxylic acid, sodium alkoxides such as sodium methoxide and sodium ethoxide, and metal alkoxides such as potassium alkoxides and calcium alkoxides.

Further, methods of adjusting the pH to a value within the range from 3 to 13 include methods that involve either esterifying or amidizing the acid contained within the conductive polymer solution.

In order to obtain the conductive polymer solution, first, a precursor monomer that forms the π-conjugated conductive polymer is added to a solvent in the presence of the polyanion. Subsequently, an oxidant is added, the precursor monomer is polymerized, and any excess oxidant and precursor monomer is then removed, thus yielding a solution containing a complex formed between the π-conjugated conductive polymer and the polyanion.

Examples of the precursor monomer used include pyrroles and derivatives thereof, thiophenes and derivatives thereof, and anilines and derivatives thereof.

As the oxidant, any compound capable of oxidizing the precursor monomer to form the π-conjugated conductive polymer can be used, and examples include peroxodisulfates such as ammonium peroxodisulfate (ammonium persulfate), sodium peroxodisulfate (sodium persulfate) and potassium peroxodisulfate (potassium persulfate), transition metal compounds such as ferric chloride, ferric sulfate, ferric nitrate and cupric chloride, metal halide compounds such as boron trifluoride and aluminum chloride, metal oxides such as silver oxide and cesium oxide, peroxides such as hydrogen peroxide and ozone, organic peroxides such as benzoyl peroxide, and oxygen and the like.

As the solvent, the same solvents as those used for the low-thermal expansion polymer solution can be used.

Subsequently, to the solution containing the complex are added the amide compound or the combination of the conductivity improver and the silane coupling agent, and if required, any of the optional components such as the ion-conductive polymer and the alkaline compound, thus forming the conductive polymer solution.

Examples of the method used for adhering the conductive polymer solution to the surface of the dielectric layer 12 include conventional coating, dipping and spraying techniques.

Subsequently, the conductive polymer solution adhered to the dielectric layer 12 is dried, thus forming the solid electrolyte layer 13. Examples of the drying method include conventional techniques such as room temperature drying, hot air drying, and far infrared drying.

In the solid electrolyte layer 13, the π-conjugated conductive polymer is usually formed as particles having a particle size within a range from 1 to 500 nm. As a result, the π-conjugated conductive polymer is unable to penetrate down to the deepest portions of fine voids within the surface of the dielectric layer 12, meaning it can sometimes be difficult to extract the desired capacitance. Accordingly, following formation of the solid electrolyte layer 13, the layer is preferably immersed within an electrolyte solution, when required, in order to supplement the capacitance.

There are no particular restrictions on this electrolyte solution, provided it exhibits a high degree of conductivity, and the solution can be prepared by dissolving a conventional electrolyte in a conventional solvent.

Examples of the solvent used in the electrolyte solution include alcohol-based solvents such as ethylene glycol, diethylene glycol, propylene glycol, 1,4-butanediol and glycerol, lactone-based solvents such as γ-butyrolactone, γ-valerolactone and δ-valerolactone, amide solvents such as N-methylformamide, N,N-dimethylformamide, N-methylacetamide and N-methylpyrrolidinone, nitrile solvents such as acetonitrile and 3-methoxypropionitrile, and water and the like.

Examples of the electrolyte include an anion component composed of an organic acid such as adipic acid, glutaric acid, succinic acid, benzoic acid, isophthalic acid, phthalic acid, terephthalic acid, maleic acid, toluic acid, enanthic acid, malonic acid, formic acid, a decandicarboxylic acid such as 1,6-decanedicarboxylic acid or 5,6-decanedicarboxylic acid, an octanedicarboxylic acid such as 1,7-octanedicarboxylic acid, azelaic acid or sebacic acid, or an inorganic acid such as boric acid, a boric acid polyhydric alcohol complex compound obtained from boric acid and a polyhydric alcohol, phosphoric acid, carbonic acid or silicic acid; and a cation component such as a primary amine (such as methylamine, ethylamine, propylamine, butylamine or ethylenediamine), a secondary amine (such as dimethylamine, diethylamine, dipropylamine, methylethylamine or diphenylamine), a tertiary amine (such as trimethylamine, triethylamine, tripropylamine, triphenylamine, 1,8-diazabicyclo(5,4,0)-undecene-7), or a tetraalkylammonium (such as tetramethylammonium, tetraethylammonium, tetrapropylammonium, tetrabutylammonium, methyltriethylammonium or dimethyldiethylammonium).

Subsequently, a carbon paste or a silver paste or the like is applied to the solid electrolyte layer 13, thereby forming the cathode 14 and completing the condenser 10.

The process for manufacturing a condenser 10 described above is a process in which a conductive polymer solution containing a 1-conjugated conductive polymer is adhered to the dielectric layer 12, and the adhered conductive polymer solution is then dried to form a solid electrolyte layer 13, and therefore the solution is able to penetrate readily into any fine voids within the dielectric layer 12. As a result, a high capacitance can be extracted with relative ease.

Furthermore, when the solid electrolyte layer 13 is formed using a conductive polymer solution containing an amide compound, the conductivity of the solid electrolyte layer 13 is high, and the ESR of the condenser 10 can be reduced. Further, because the solid electrolyte layer 13 exhibits a high level of heat resistance, the heat resistance of the condenser 10 can also be enhanced.

On the other hand, when the conductive polymer solution contains a silane coupling agent, the dielectric layer 12 to which the conductive polymer solution is applied and the solid electrolyte layer 13 formed from the conductive polymer solution can be bonded strongly together, and as a result, the withstand voltage of the condenser 10 can be increased even if the thickness of the dielectric layer 12 is reduced. Further, because this manufacturing process is not a process in which the solid electrolyte layer 13 is formed on top of the dielectric layer 12 using an electrolytic polymerization method or a chemical oxidative polymerization method, and moreover, the conductive polymer solution also includes a conductivity improver, the conductivity of the solid electrolyte layer 13 can be improved, and the ESR of the condenser 10 can be reduced to a level that is practically applicable. Furthermore, a satisfactory electrostatic capacitance can also be ensured for the condenser 10.

In the process for manufacturing a condenser 10 described above, a low-thermal expansion polymer solution is applied to the surface of the dielectric layer 12 to form an intermediate layer 16, and the solid electrolyte layer 13 is then formed on the surface of this intermediate layer 16, and as a result, shorting between the anode 11 and the solid electrolyte layer 13 caused by thermal stress can be suppressed, enabling the failure rate to be reduced. Further, because the solid electrolyte layer 13 is formed by applying, and then drying, a conductive polymer solution containing an already polymerized π-conjugated conductive polymer, the process is simple, particularly suitable for mass production, and low-cost.

Figure 3:
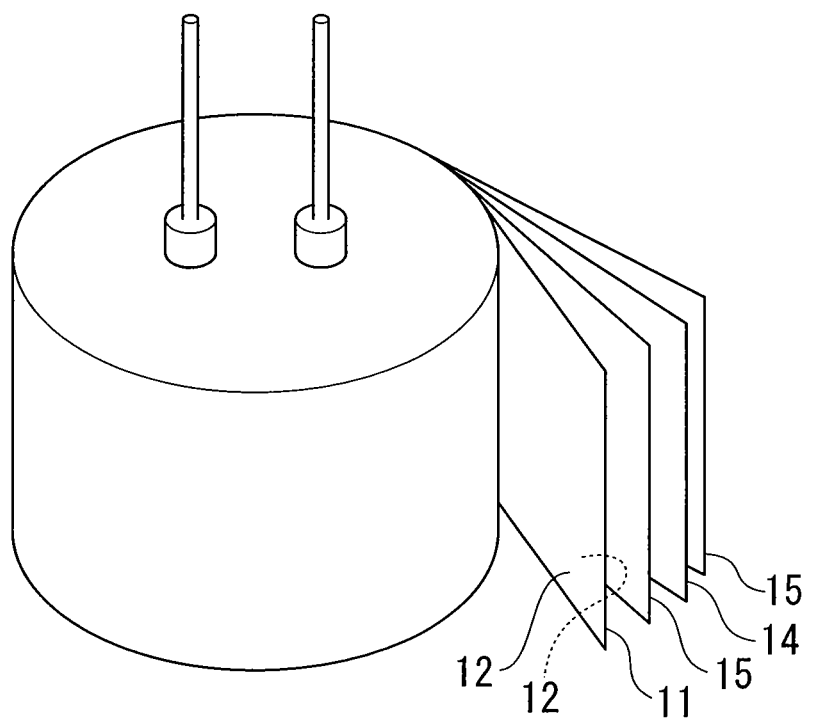
FIG. 3 is a perspective illustration showing yet another embodiment of the condenser of the present invention.

The process for manufacturing a condenser according to the present invention is not limited to the embodiments described above. For example, as shown in FIG. 3, the condenser of the present invention may, if required, include a separator 15 provided between the dielectric layer 12 and the cathode 14. An example of a condenser that includes a separator 15 provided between the dielectric layer 12 and the cathode 14 is a wound condenser.

As the separator 15, a sheet (including a non-woven fabric) composed of a polyvinyl alcohol, polyester, polyethylene, polystyrene, polypropylene, polyimide, polyamide or a polyvinylidene fluoride or the like, or a non-woven sheet of glass fiber or the like can be used.

The density of the separator 15 is preferably within a range from 0.1 to 1 g/cm$^3$, and is even more preferably from 0.2 to 0.8 g/cm$^3$. In those cases where a separator 15 is provided, a method can be employed in which a carbon paste or silver paste is impregnated into the separator 15 to form the cathode 14.

Furthermore, in the condenser of the present invention, an electrolyte solution can be used if required. By using an electrolyte solution in combination with the condenser of the present invention, the capacitance can be increased even more simply. There are no particular restrictions on the electrolyte solution, provided it exhibits a high degree of electrical conductivity, and the solution can be prepared by dissolving a conventional electrolyte in a conventional electrolyte solvent.

Examples of the electrolyte solvent include alcohol-based solvents such as ethylene glycol, diethylene glycol, propylene glycol, 1,4-butanediol and glycerol, lactone-based solvents such as γ-butyrolactone, γ-valerolactone and δ-valerolactone, amide solvents such as N-methylformamide, N,N-dimethylformamide, N-methylacetamide and N-methylpyrrolidinone, nitrile solvents such as acetonitrile and 3-methoxypropionitrile, and water and the like.

Examples of the electrolyte include an anion component composed of an organic acid such as adipic acid, glutaric acid, succinic acid, benzoic acid, isophthalic acid, phthalic acid, terephthalic acid, maleic acid, toluic acid, enanthic acid, malonic acid, formic acid, a decandicarboxylic acid such as 1,6-decanedicarboxylic acid or 5,6-decanedicarboxylic acid, an octanedicarboxylic acid such as 1,7-octanedicarboxylic acid, azelaic acid or sebacic acid, or an inorganic acid such as boric acid, a boric acid polyhydric alcohol complex compound obtained from boric acid and a polyhydric alcohol, phosphoric acid, carbonic acid or silicic acid; and a cation component such as a primary amine (such as methylamine, ethylamine, propylamine, butylamine or ethylenediamine), a secondary amine (such as dimethylamine, diethylamine, dipropylamine, methylethylamine or diphenylamine), a tertiary amine (such as trimethylamine, triethylamine, tripropylamine, triphenylamine, 1,8-diazabicyclo(5,4,0)-undecene-7), or a tetraalkylammonium (such as tetramethylammonium, tetraethylammonium, tetrapropylammonium, tetrabutylammonium, methyltriethylammonium or dimethyldiethylammonium).

Furthermore, in those cases where the solid electrolyte layer is utilized as the cathode, a separate cathode need not necessarily be provided. In such cases, the present invention enables damage to the anode to be prevented, and enables the withstand voltage to be increased.

EXAMPLES

A more detailed description of the present invention is presented below based on a series of examples. In the following examples, pH values refer to values measured at 25° C.

Example 1

(1) Preparation of Conductive Polymer Solution 14.2 g (0.1 mol) of 3,4-ethylenedioxythiophene, and a solution prepared by dissolving 27.5 g (0.15 mol) of a polystyrenesulfonic acid (molecular weight: about 150,000) in 2,000 ml of ion-exchanged water were mixed at 20° C.

With the obtained mixed solution undergoing constant stirring at 20° C., a solution containing 29.64 g (0.13 mol) of ammonium persulfate dissolved in 200 ml of ion-exchanged water, and 8.0 g (0.02 mol) of a ferric sulfate oxidation catalyst solution were added, and the resulting mixture was then stirred and allowed to react for 3 hours.

The resulting reaction mixture was subjected to a dialysis treatment, thereby removing the unreacted monomer, oxidant and oxidation catalyst, and yielding a solution containing approximately 1.5% by mass of a polystyrenesulfonic acid-doped poly(3,4-ethylenedioxythiophene) (hereafter referred to as the complex solution).

To 100 g of this complex solution were added, under constant stirring, 1.8 g of 5% by mass ammonia water, followed by 6.0 g of N-hydroxyethylacrylamide, thus yielding a conductive polymer solution.

(2) Manufacture of Condenser

An etched aluminum foil (an anode foil) was connected to an anode lead terminal, and was then subjected to a chemical conversion treatment (an oxidation treatment) by applying a voltage of 100 V within a 10% by mass aqueous solution of ammonium adipate, thereby forming a dielectric layer on the surface of the aluminum foil and completing preparation of a condenser intermediate.

Next, an opposing aluminum cathode foil with a cathode lead terminal welded thereto was laminated to the anode foil of the condenser intermediate, with a cellulose separator disposed therebetween, and the resulting laminate was then wound to form a condenser element.

A process in which this condenser element was dipped, under reduced pressure conditions, in the conductive polymer solution prepared in (1) above, and subsequently dried for 10 minutes at 120° C. in a hot air dryer, was repeated five times, thereby forming a solid electrolyte layer on the surface of the dielectric layer of the condenser intermediate.

Subsequently, the condenser element with the solid electrolyte layer formed thereon was packed in an aluminum case and sealed with a sealing rubber to complete preparation of a condenser.

The electrostatic capacitance at 120 Hz and the initial value of the equivalent series resistance (ESR) at 100 kHz for the prepared condenser were measured using a LCZ meter 2345 (manufactured by NF Corporation).

Furthermore, the withstand voltage of the condenser was measured in the following manner. Namely, a direct current voltage was applied to the two electrodes and then raised at a rate of 0.2 V/second, and the voltage at the point where the current reached 0.4 A was measured and recorded as the withstand voltage.

The results of these measurements are shown in Table 1.

TABLE 1

| | No. | pH of conductive polymer solution | Electro-static capacitance (μF) | ESR (mΩ) | Withstand voltage (V) |
|---|---|---|---|---|---|
| Example | 1 | 8.5 | 47 | 14 | 80 |
| | 2 | 8.5 | 47 | 13 | 80 |
| | 3 | 8.5 | 45 | 13 | 95 |
| | 4 | 8.5 | 47 | 13 | 95 |
| | 5 | 8.1 | 47 | 13 | 95 |
| | 6 | 8.5 | 47 | 13 | 95 |
| Comparative example | 1 | 1.8 | 9 | 560 | 35 |
| | 2 | 8.6 | 30 | 430 | 60 |
| | 3 | 8.5 | 32 | 75 | 43 |

Example 2

With the exception of adding, to 100 g of the complex solution of Example 1 under constant stirring, 6.0 g of N-hydroxyethylacetamide instead of the 6.0 g of N-hydroxyethylacrylamide, a condenser was prepared in the same manner as Example 1. The electrostatic capacitance, the ESR, and the withstand voltage of the condenser were then measured in the same manner as Example 1. The results of these measurements are shown in Table 1.

Example 3

With the exception of adding, to 100 g of the complex solution of Example 1 under constant stirring, 1.8 g of 5% by mass ammonia water, followed by 4.5 g of a polyethylene glycol 400 (number average molecular weight: 400) and then 4.5 g of N-hydroxyethylacrylamide, a conductive polymer solution was prepared in the same manner as Example 1. Using this conductive polymer solution, a condenser was prepared in the same manner as Example 1. The electrostatic capacitance, the ESR, and the withstand voltage of the condenser were then measured in the same manner as Example 1. The results of these measurements are shown in Table 1.

Example 4

With the exception of adding, to 100 g of the complex solution of Example 1 under constant stirring, 1.8 g of 5% by mass ammonia water, followed by 4.5 g of a polyethylene glycol 1000 (number average molecular weight: 1,000) and then 4.5 g of N-hydroxyethylacrylamide, a conductive polymer solution was prepared in the same manner as Example 1. Using this conductive polymer solution, a condenser was prepared in the same manner as Example 1. The electrostatic capacitance, the ESR, and the withstand voltage of the condenser were then measured in the same manner as Example 1. The results of these measurements are shown in Table 1.

Example 5

With the exception of adding, to 100 g of the complex solution of Example 1 under constant stirring, 1.5 g of 1-hydroxyethylimidazole, followed by 4.5 g of the polyethylene glycol 400 and then 4.5 g of N-hydroxyethylacrylamide, a conductive polymer solution was prepared in the same manner as Example 1. Using this conductive polymer solution, a condenser was prepared in the same manner as Example 1. The electrostatic capacitance, the ESR, and the withstand voltage of the condenser were then measured in the same manner as Example 1. The results of these measurements are shown in Table 1.

Example 6

With the exception of adding, to 100 g of the complex solution of Example 1 under constant stirring, 1.8 g of 5% by mass ammonia water, followed by 4.5 g of the polyethylene glycol 1000 and then 6.0 g of N-hydroxyethylacetamide, a conductive polymer solution was prepared in the same manner as Example 1. Using this conductive polymer solution, a condenser was prepared in the same manner as Example 1. The electrostatic capacitance, the ESR, and the withstand voltage of the condenser were then measured in the same manner as Example 1. The results of these measurements are shown in Table 1.

Comparative Example 1

With the exception of not adding the amide compound to the complex solution of Example 1, and simply using the complex solution, as is, as a conductive polymer solution, a condenser was prepared in the same manner as Example 1. The electrostatic capacitance, the ESR, and the withstand voltage of the condenser were then measured in the same manner as Example 1. The results of these measurements are shown in Table 1.

Comparative Example 2

With the exception of adding, to 100 g of the complex solution of Example 1, 1.8 g of 5% by mass ammonia water, but not adding an amide compound, a condenser was prepared in the same manner as Example 1. The electrostatic capacitance, the ESR, and the withstand voltage of the condenser were then measured in the same manner as Example 1. The results of these measurements are shown in Table 1.

Comparative Example 3

With the exception of adding, to 100 g of the complex solution of Example 1, 1.8 g of 5% by mass ammonia water, followed by 2.5 g of trihydroxybenzene, but not adding an amide compound, a condenser was prepared in the same manner as Example 1. The electrostatic capacitance, the ESR, and the withstand voltage of the condenser were then measured in the same manner as Example 1. The results of these measurements are shown in Table 1.

All the condensers of Examples 1 to 6 including a solid electrolyte layer which contained a π-conjugated conductive polymer, a polyanion and an amide compound exhibited low ESR values. Further, the electrostatic capacitance was also satisfactorily maintained in each case. Moreover, the condensers of Examples 3 to 6, which also included an ion-conductive polymer, also exhibited a high withstand voltage.

The condensers of Comparative Examples 1 to 3 including a solid electrolyte layer which contained a π-conjugated conductive polymer and a polyanion, but lacked an amide compound displayed high ESR values.

Example 7

(1) Preparation of Conductive Polymer Solution 14.2 g (0.1 mol) of 3,4-ethylenedioxythiophene, and a solution prepared by dissolving 27.5 g (0.15 mol) of a polystyrenesulfonic acid in 2,000 ml of ion-exchanged water were mixed.

With the obtained mixed solution undergoing constant stirring at 20° C., a solution containing 29.64 g (0.13 mol) of ammonium persulfate dissolved in 200 ml of ion-exchanged water, and 8.0 g (0.02 mol) of a ferric sulfate oxidation catalyst solution were added gradually, and the resulting mixture was then stirred and allowed to react for 3 hours.

The resulting reaction mixture was subjected to a dialysis treatment, thereby removing the unreacted monomer and oxidant, and yielding a blue-colored solution containing approximately 1.5% by mass of a polystyrenesulfonic acid-doped poly(3,4-ethylenedioxythiophene). This solution was used as a complex solution.

4.00 g of N-methyl-N-vinylacetamide was dispersed uniformly within 10 g of this complex solution, yielding a conductive polymer solution (1). This conductive polymer solution (1) was applied to a glass plate and then dried at 120° C. in a hot air dryer, thus forming a conductive coating with a thickness of 2 μm. The electrical conductivity of this conductive coating was measured using a LORESTA (manufactured by Mitsubishi Chemical Corporation). The result is shown in Table 2.

TABLE 2

|  | Example | | | | | Comparative example |
| --- | --- | --- | --- | --- | --- | --- |
|  | 7 | 8 | 9 | 10 | 11 | 4 |
| Electrical conductivity (S/cm) | 1435 | 898 | 809 | 153 | 198 | 3 |
| Electrostatic capacitance (μF) | 1280 | 1227 | 1229 | 1135 | 1184 | 1202 |
| N-methyl-N-vinylacetamide content (%) | 28 | 32 | 37 | 10 | 86 | 0 |
| ESR        Initial | 17 | 11 | 12 | 76 | 89 | 55 |
| (mΩ)     500 hours at 125° C. | 19 | 12 | 14 | 80 | 92 | 234 |

(2) Manufacture of Condenser

An etched aluminum foil (an anode foil) was connected to an anode lead terminal, and was then subjected to a chemical conversion treatment (an oxidation treatment) by applying a voltage of 10 V within a 10% by mass aqueous solution of ammonium adipate, thereby forming a dielectric layer on the surface of the aluminum foil and completing preparation of a condenser intermediate.

Next, an opposing aluminum cathode foil with a cathode lead terminal welded thereto was laminated to the anode foil of the condenser intermediate, with a cellulose separator disposed therebetween, and the resulting laminate was then wound to form a condenser element.

This condenser element was dipped in the above conductive polymer solution (1), and subsequently dried at 120° C. in a hot air dryer, thereby forming a solid electrolyte layer on the surface of the dielectric layer of the condenser intermediate.

Subsequently, the condenser element with the solid electrolyte layer formed thereon, and an electrolyte solution composed of a solution containing 20% by mass of ammonium hydrogen adipate and 80% by mass of ethylene glycol were packed in an aluminum case and sealed with a sealing rubber, thereby completing preparation of a condenser.

The electrostatic capacitance at 120 Hz, the initial value of the equivalent series resistance (ESR) at 100 kHz, and the ESR following standing for 500 hours in an atmosphere at 125° C. were measured for the prepared condenser using a LCZ meter 2345 (manufactured by NF Corporation).

The results of these measurements are shown in Table 2.

Example 8

7.00 g of N-methyl-N-vinylacetamide was dispersed uniformly within 10 g of the complex solution to form a conductive polymer solution (2), and with the exception of using this conductive polymer solution (2), a condenser was prepared in the same manner as Example 7. This condenser was then evaluated in the same manner as Example 1. The results of these evaluations are shown in Table 2.

Example 9

10.00 g of N-methyl-N-vinylacetamide was dispersed uniformly within 10 g of the complex solution to form a conductive polymer solution (3), and with the exception of using this conductive polymer solution (3), a condenser was prepared in the same manner as Example 7. This condenser was then evaluated in the same manner as Example 7. The results of these evaluations are shown in Table 2.

Example 10

0.12 g of N-methyl-N-vinylacetamide was dispersed uniformly within 10 g of the complex solution to form a conductive polymer solution (4), and with the exception of using this conductive polymer solution (4), a condenser was prepared in the same manner as Example 7. This condenser was then evaluated in the same manner as Example 7. The results of these evaluations are shown in Table 2.

Example 11

50.00 g of N-methyl-N-vinylacetamide was dispersed uniformly within 10 g of the complex solution to form a conductive polymer solution (5), and with the exception of using this conductive polymer solution (5), a condenser was prepared in the same manner as Example 7. This condenser was then evaluated in the same manner as Example 7. The results of these evaluations are shown in Table 2.

Comparative Example 4

With the exception of using 10 g of the complex solution, as is, as a conductive polymer solution, a condenser was prepared in the same manner as Example 1. This condenser was then evaluated in the same manner as Example 7. The results of these evaluations are shown in Table 2.

Example 12

With the exception of not including the electrolyte solution when preparing the condenser of Example 7, a condenser was prepared in the same manner as Example 7. This condenser was then evaluated in the same manner as Example 7. The results of these evaluations are shown in Table 3.

TABLE 3

|  | Example | | | | | Comparative example |
| --- | --- | --- | --- | --- | --- | --- |
|  | 12 | 13 | 14 | 15 | 16 | 5 |
| Electrostatic capacitance (μF) | 1075 | 1055 | 1096 | 48 | 8 | 44 |
| N-methyl-N-vinylacetamide content (%) | 28 | 32 | 37 | 10 | 86 | 0 |
| ESR Initial (mΩ) | 18 | 12 | 13 | 120 | 325 | 1330 |
| 500 hours at 125° C. | 42 | 25 | 26 | 1410 | 1530 | 13552 |

Example 13

With the exception of using the conductive polymer solution (2) instead of the conductive polymer solution (1), a condenser was prepared in the same manner as Example 6. This condenser was then evaluated in the same manner as Example 7. The results of these evaluations are shown in Table 3.

Example 14

With the exception of using the conductive polymer solution (3) instead of the conductive polymer solution (1), a condenser was prepared in the same manner as Example 12. This condenser was then evaluated in the same manner as Example 7. The results of these evaluations are shown in Table 3.

Example 15

With the exception of using the conductive polymer solution (4) instead of the conductive polymer solution (1), a condenser was prepared in the same manner as Example 12. This condenser was then evaluated in the same manner as Example 7. The results of these evaluations are shown in Table 3.

Example 16

With the exception of using the conductive polymer solution (5) instead of the conductive polymer solution (1), a condenser was prepared in the same manner as Example 12. This condenser was then evaluated in the same manner as Example 7. The results of these evaluations are shown in Table 3.

Comparative Example 5

With the exception of using 10 g of the complex solution, as is, as a conductive polymer solution, a condenser was prepared in the same manner as Example 12. This condenser was then evaluated in the same manner as Example 7. The results of these evaluations are shown in Table 3.

All the condensers of Examples 7 to 16 including a solid electrolyte layer which contained a π-conjugated conductive polymer, a polyanion and a compound containing a vinyl group and an amide group exhibited low ESR values. Further, even following heating, increases in the ESR value were able to be suppressed. Furthermore, in Examples 7 to 16, because the conductive polymer solution permeated into the dielectric layer, the electrostatic capacitance was also high.

The condensers of Comparative Examples 4 and 5 including a solid electrolyte layer which contained a π-conjugated conductive polymer and a polyanion, but lacked a compound containing a vinyl group and an amide group, displayed high ESR values.

Example 17

(1) Preparation of Conductive Polymer Solution 14.2 g (0.1 mol) of 3,4-ethylenedioxythiophene, and a solution prepared by dissolving 27.5 g (0.15 mol) of a polystyrenesulfonic acid (molecular weight: approximately 150,000) in 2,000 ml of ion-exchanged water were mixed at 20° C.

With the obtained mixed solution undergoing constant stirring at 20° C., a solution containing 29.64 g (0.13 mol) of ammonium persulfate dissolved in 200 ml of ion-exchanged water, and 8.0 g (0.02 mol) of a ferric sulfate oxidation catalyst solution were added, and the resulting mixture was then stirred and allowed to react for 3 hours.

The resulting reaction mixture was subjected to a dialysis treatment, thereby removing the unreacted monomer, oxidant and oxidation catalyst, and yielding a solution containing approximately 1.5% by mass of a polystyrenesulfonic acid-doped poly(3,4-ethylenedioxythiophene) (hereafter referred to as the complex solution).

To 100 g of this complex solution were added, under constant stirring, 0.36 g of 25% by mass ammonia water, followed by 6.0 g of polyethylene glycol 200 (number average molecular weight: 200) as a conductivity improver, and 0.5 g of 3-glycidoxypropyltriethoxysilane as a silane coupling agent, thus yielding a conductive polymer solution with a pH of 8.5.

(2) Manufacture of Condenser

An etched aluminum foil (an anode foil) was connected to an anode lead terminal, and was then subjected to a chemical conversion treatment (an oxidation treatment) by applying a voltage of 100 V within a 10% by mass aqueous solution of ammonium adipate, thereby forming a dielectric layer on the surface of the aluminum foil and completing preparation of a condenser intermediate.

Next, an opposing aluminum cathode foil with a cathode lead terminal welded thereto was laminated to the anode foil of the condenser intermediate, with a cellulose separator disposed therebetween, and the resulting laminate was then wound to form a condenser element.

A process in which this condenser element was dipped, under reduced pressure conditions, in the conductive polymer solution prepared in (1) above, and subsequently dried for 10 minutes at 120° C. in a hot air dryer, was repeated three times, thereby forming a solid electrolyte layer on the surface of the dielectric layer of the condenser intermediate.

Subsequently, the condenser element with the solid electrolyte layer formed thereon was packed in an aluminum case and sealed with a sealing rubber to complete preparation of a condenser.

The electrostatic capacitance at 120 Hz and the initial value of the equivalent series resistance (ESR) at 100 kHz for the prepared condenser were measured using a LCZ meter 2345 (manufactured by NF Corporation).

Furthermore, the withstand voltage of the condenser was measured in the following manner. Namely, a direct current voltage was applied to the two electrodes and then raised at a rate of 0.2 V/second, and the voltage at the point where the current reached 0.4 A was measured and recorded as the withstand voltage.

The results of these measurements are shown in Table 4.

TABLE 4

|  | Electrostatic capacitance (μF) | ESR (mΩ) | Withstand voltage (V) |
| --- | --- | --- | --- |
| Example 17 | 48 | 18 | 95 |
| Example 18 | 47 | 20 | 90 |
| Example 19 | 47 | 34 | 95 |
| Example 20 | 49 | 23 | 80 |
| Example 21 | 48 | 30 | 100 |
| Example 22 | 48 | 107 | 110 |
| Example 23 | 48 | 21 | 105 |
| Example 24 | 48 | 18 | 100 |
| Example 25 | 48 | 144 | 110 |
| Comparative example 6 | 6 | 553 | 43 |
| Comparative example 7 | 48 | 19 | 80 |
| Comparative example 8 | 47 | 20 | 70 |
| Comparative example 9 | 48 | 24 | 70 |
| Comparative example 10 | 48 | 26 | 80 |
| Comparative example 11 | 48 | 19 | 85 |

Example 18

With the exception of adding, to 100 g of the complex solution of Example 17, 5.0 g of dimethylsulfoxide instead of the 6.0 g of polyethylene glycol 200 as the conductivity improver, a condenser was prepared in the same manner as Example 17. The electrostatic capacitance, the ESR, and the withstand voltage of the condenser were then measured in the same manner as Example 17. The results of these measurements are shown in Table 4.

Example 19

With the exception of adding, to 100 g of the complex solution of Example 17, 0.4 g of imidazole and 0.6 g of 3-glycidoxypropyltrimethoxysilane, a condenser was prepared in the same manner as Example 17. The electrostatic capacitance, the ESR, and the withstand voltage of the condenser were then measured in the same manner as Example 17. The results of these measurements are shown in Table 4.

Example 20

With the exception of replacing the 0.6 g of 3-glycidoxypropyltrimethoxysilane with 0.6 g of 3-methacryloxypropyltrimethoxysilane, a condenser was prepared in the same manner as Example 19. The electrostatic capacitance, the ESR, and the withstand voltage of the condenser were then measured in the same manner as Example 17. The results of these measurements are shown in Table 4.

Example 21

With the exception of adding, to 100 g of the complex solution of Example 17, 0.4 g of imidazole, 0.6 g of 3-glycidoxypropyltrimethoxysilane and 3.6 g of dimethylsulfoxide, a condenser was prepared in the same manner as Example 17. The electrostatic capacitance, the ESR, and the withstand voltage of the condenser were then measured in the same manner as Example 17. The results of these measurements are shown in Table 4.

Example 22

With the exception of replacing the 0.6 g of 3-glycidoxypropyltrimethoxysilane with 0.6 g of 3-methacryloxypropyltrimethoxysilane, a condenser was prepared in the same manner as Example 21. The electrostatic capacitance, the ESR, and the withstand voltage of the condenser were then measured in the same manner as Example 17. The results of these measurements are shown in Table 4.

Example 23

With the exception of adding, to 100 g of the complex solution of Example 17, 0.4 g of imidazole, 0.6 g of 3-glycidoxypropyltrimethoxysilane and 3.6 g of polyethylene glycol 400, a condenser was prepared in the same manner as Example 17. The electrostatic capacitance, the ESR, and the withstand voltage of the condenser were then measured in the same manner as Example 17. The results of these measurements are shown in Table 4.

Example 24

With the exception of replacing the 0.6 g of 3-glycidoxypropyltrimethoxysilane with 0.6 g of 3-methacryloxypropyltrimethoxysilane, a condenser was prepared in the same manner as Example 23. The electrostatic capacitance, the ESR, and the withstand voltage of the condenser were then measured in the same manner as Example 17. The results of these measurements are shown in Table 4.

Example 25

With the exception of replacing the 0.6 g of 3-glycidoxypropyltrimethoxysilane with 0.6 g of N-(2-aminoethyl)-3-aminopropyltrimethoxysilane, a condenser was prepared in the same manner as Example 23. The electrostatic capacitance, the ESR, and the withstand voltage of the condenser were then measured in the same manner as Example 17. The results of these measurements are shown in Table 4.

Comparative Example 6

With the exception of using the complex solution of Example 17, as is, as a conductive polymer solution, a condenser was prepared in the same manner as Example 17. This condenser was then evaluated in the same manner as Example 17. The results of these evaluations are shown in Table 4.

Comparative Example 7

With the exception of adding, to 100 g of the complex solution of Example 17, 0.36 g of 25% by mass ammonia water and 6.0 g of polyethylene glycol 200, but not adding the 3-glycidoxypropyltriethoxysilane, a condenser was prepared in the same manner as Example 17. The electrostatic capacitance, the ESR, and the withstand voltage of the condenser were then measured in the same manner as Example 17. The results of these measurements are shown in Table 4.

Comparative Example 8

With the exception of adding, to 100 g of the complex solution of Example 17, 0.36 g of 25% by mass ammonia water and 5.0 g of dimethylsulfoxide, but not adding the 3-glycidoxypropyltriethoxysilane, a condenser was prepared in the same manner as Example 17. The electrostatic capacitance, the ESR, and the withstand voltage of the condenser were then measured in the same manner as Example 17. The results of these measurements are shown in Table 4.

Comparative Example 9

With the exception of not adding the 0.6 g of 3-methacryloxypropyltrimethoxysilane, a condenser was prepared in the same manner as Example 19. The electrostatic capacitance, the ESR, and the withstand voltage of the condenser were then measured in the same manner as Example 17. The results of these measurements are shown in Table 4.

Comparative Example 10

With the exception of not adding the 0.6 g of 3-glycidoxypropyltrimethoxysilane, a condenser was prepared in the same manner as Example 21. The electrostatic capacitance, the ESR, and the withstand voltage of the condenser were measured in the same manner as Example 17. The results of these measurements are shown in Table 4.

Comparative Example 11

With the exception of not adding the 0.6 g of 3-glycidoxypropyltrimethoxysilane, a condenser was prepared in the same manner as Example 23. The electrostatic capacitance, the ESR, and the withstand voltage of the condenser were measured in the same manner as Example 17. The results of these measurements are shown in Table 4.

The condensers of Examples 17 to 25 including a solid electrolyte layer which contained a π-conjugated conductive polymer, a polyanion, a conductivity improver and a silane coupling agent, all exhibited high withstand voltage values. Further, the ESR was of a sufficiently low level to be practically applicable, and the electrostatic capacitance was also satisfactorily maintained in each case.

In contrast, the condensers of Comparative Examples 6 to 11, which included a solid electrolyte layer that lacked a silane coupling agent, displayed low withstand voltage values.

Example 26

(1) Preparation of Conductive Polymer Solution 14.2 g of 3,4-ethylenedioxythiophene, and a solution prepared by dissolving 36.7 g of a polystyrenesulfonic acid in 2,000 ml of ion-exchanged water were mixed at 20° C.

With the obtained mixed solution undergoing constant stirring at 20° C., a solution containing 29.64 g of ammonium persulfate dissolved in 200 ml of ion-exchanged water, and 8.0 g of a ferric sulfate oxidation catalyst solution were added gradually, and the resulting mixture was then stirred and allowed to react for 3 hours.

2,000 ml of ion-exchanged water was added to the thus obtained reaction solution, and approximately 2,000 ml of the solution was then removed by ultrafiltration. This operation was repeated three times.

To the resulting solution were added 200 ml of 10% by mass dilute sulfuric acid and 2,000 ml of ion-exchanged water, approximately 2,000 ml of the solution was removed by ultrafiltration, 2,000 ml of ion-exchanged water was added, and approximately 2,000 ml of the solution was removed by ultrafiltration. This operation was repeated three times.

Subsequently, 2,000 ml of ion-exchanged water was added to the thus obtained solution, and approximately 2,000 ml of the solution was removed by ultrafiltration. This operation was repeated five times, yielding a polymer solution containing approximately 1.5% by mass of a blue-colored polystyrenesulfonic acid-doped poly(3,4-ethylenedioxythiophene) (PSS-PEDOT).

2.79 g of imidazole was added to, and dispersed uniformly within, 100 g of the thus obtained polymer solution, thus yielding a conductive polymer solution.

(2) Preparation of Low-thermal Expansion Polymer-containing Solution

To 1 g of an aqueous urethane resin RESAMINE D-6300 (manufactured by Dainichiseika Color & Chemicals Mfg. Co., Ltd., 30% by mass, average coefficient of thermal expansion within a range from 30 to 120° C.: 280 ppm/° C.) was added 299 g of ion-exchanged water, thereby yielding 300 g of a 0.1% by mass low-thermal expansion polymer solution A.

(3) Manufacture of Condenser

An etched aluminum foil (an anode foil) was connected to an anode lead terminal, and was then subjected to a chemical conversion treatment (an oxidation treatment) in a 10% by mass aqueous solution of ammonium adipate, thereby forming a dielectric layer on the surface of the aluminum foil and completing preparation of a condenser intermediate.

Next, an opposing aluminum cathode foil with a cathode lead terminal welded thereto was laminated to the condenser intermediate, and the resulting laminate was then wound to form a condenser element. During winding, a separator was sandwiched between the anode foil and the cathode foil of the condenser intermediate.

Following dipping of the condenser element in the low-thermal expansion polymer solution A prepared in (2) above, the element was dried at 120° C. in a hot air dryer, thereby forming an intermediate layer between the dielectric layer of the anode foil and the cathode foil.

Subsequently, the condenser element with the formed intermediate layer was dipped in the conductive polymer solution prepared in (1) above, and was then dried at 120° C. in a hot air dryer, thereby forming a solid electrolyte layer on the surface of the dielectric layer of the condenser intermediate.

Subsequently, the condenser element with the solid electrolyte layer formed thereon, and an electrolyte solution composed of a solution containing 20% by mass of ammonium hydrogen adipate and 80% by mass of ethylene glycol were packed in an aluminum case and sealed with a sealing rubber to complete preparation of a condenser.

Example 27

A low-thermal expansion polymer solution B was prepared containing 0.1% by mass of a water-soluble polyester (PLAS COAT Z-561, manufactured by Goo Chemical Co., Ltd., average coefficient of thermal expansion within a range from 30 to 120° C.: 65 ppm/° C.).

With the exception of using this low-thermal expansion polymer solution B instead of the low-thermal expansion polymer solution A, a condenser was prepared in the same manner as that described in Example 26, section (3).

Example 28

A low-thermal expansion polymer solution C was prepared containing 0.1% by mass of a solvent-soluble polyimide (a copolymer of oxydiphthalic anhydride and 2,4-toluenediamine, average coefficient of thermal expansion within a range from 30 to 120° C.: 25 ppm/° C.).

With the exception of using this low-thermal expansion polymer solution C instead of the low-thermal expansion polymer solution A, a condenser was prepared in the same manner as that described in Example 26, section (3).

Comparative Example 12

With the exception of not forming the intermediate layer during manufacture of the condenser, a condenser was prepared in the same manner as Example 26.

Comparative Example 13

With the exceptions of not forming the intermediate layer, and forming a solid electrolyte layer by dipping the condenser element in a solution prepared by dissolving 14.2 g of 3,4-ethylenedioxythiophene and 98.5 g of iron (III) p-toluenesulfonate in 2,000 ml of ion-exchanged water, and conducting a chemical oxidative polymerization, a condenser was prepared in the same manner as Example 26.

<Evaluations>

The withstand voltage, the electrostatic capacitance at 120 Hz, and the value of the equivalent series resistance (ESR) at 100 kHz were measured for each of the prepared condensers. The results of these measurements are shown in Table 5.

The withstand voltage was measured in the following manner. Namely, a direct current voltage was applied to the two electrodes of the condenser and then raised at a rate of 0.2 V/second, and the voltage at the point where the current reached 0.4 A was measured and recorded as the withstand voltage.

The electrostatic capacitance at 120 Hz and the equivalent series resistance (ESR) at 100 kHz were measured using a LCZ meter 2345 (manufactured by NF Corporation).

TABLE 5

|  | Example 26 | Example 27 | Example 28 | Comparative example 12 | Comparative example 13 |
|---|---|---|---|---|---|
| Withstand voltage (V) | 16 | 16 | 15 | 11 | 6 |
| Electrostatic capacitance (μF) | 1240 | 1250 | 1234 | 1250 | 1235 |
| ESR (mΩ) | 18 | 18 | 18 | 15 | 12 |

All the condensers of Examples 26 to 28 that included an intermediate layer had high withstand voltages, whereas the condensers of Comparative Examples 12 and 13 that did not include an intermediate layer had low withstand voltages. Moreover, the condenser of Comparative Example 13, in which a solid electrolyte layer had been formed by a chemical oxidative polymerization, suffered form a low level of productivity.

Example 29

(1) Preparation of Conductive Polymer Solution 14.2 g (0.1 mol) of 3,4-ethylenedioxythiophene, and a solution prepared by dissolving 27.5 g (0.15 mol) of a polystyrenesulfonic acid (molecular weight: approximately 150,000) in 2,000 ml of ion-exchanged water were mixed at 20° C. With the obtained mixed solution undergoing constant stirring at 20° C., a solution containing 29.64 g (0.13 mol) of ammonium persulfate dissolved in 200 ml of ion-exchanged water, and 8.0 g (0.02 mol) of a ferric sulfate oxidation catalyst solution were added, and the resulting mixture was then stirred and allowed to react for 3 hours.

The resulting reaction mixture was subjected to a dialysis treatment, thereby removing the unreacted monomer, oxidant and oxidation catalyst, and yielding a solution containing approximately 1.5% by mass of a polystyrenesulfonic acid-doped poly(3,4-ethylenedioxythiophene) (hereafter referred to as the complex solution).

2.5 g of 1-(2-hydroxyethyl)imidazole was dissolved in 100 g of this complex solution, and 6.0 g of diethylene glycol was then added, yielding a conductive polymer solution with a pH of 8.3.

In order to evaluate the performance of the π-conjugated conductive polymer, the obtained conductive polymer solution was applied to the surface of a glass sheet and then dried in a hot air dryer at 120° C., thus forming a conductive coating with a thickness of 2 μm. The electrical conductivity of this conductive coating was measured using a LORESTA (manufactured by Mitsubishi Chemical Corporation). The result is shown in Table 6.

TABLE 6

|  | pH of conductive polymer solution | Electrical conductivity (S/cm) | Electrostatic capacitance (μF) | ESR (mΩ) Initial | ESR (mΩ) After 1,000 hours |
|---|---|---|---|---|---|
| Example 29 | 8.3 | 540 | 47 | 12 | 13 |
| Example 30 | 8.4 | 435 | 46 | 14 | 15 |
| Example 31 | 8.2 | 530 | 43 | 15 | 15 |
| Example 32 | 7.5 | 158 | 45 | 13 | 14 |
| Example 33 | 8.1 | 346 | 47 | 12 | 13 |
| Example 34 | 8.6 | 380 | 47 | 12 | 13 |
| Example 35 | 8.3 | 420 | 47 | 12 | 13 |
| Example 36 | 8.5 | 530 | 45 | 12 | 13 |
| Example 37 | 8.3 | 415 | 46 | 13 | 14 |
| Example 38 | 8.1 | 550 | 47 | 12 | 13 |
| Example 39 | 8.1 | 380 | 47 | 13 | 14 |
| Example 40 | 8.1 | 250 | 46 | 12 | 13 |
| Comparative example 14 | 2.0 | 2.0 | 7 | 530 | 1030 |
| Comparative example 15 | 8.6 | 0.5 | 32 | 430 | 670 |
| Comparative example 16 | 2.1 | 620 | 23 | 380 | 720 |
| Comparative example 17 | 2.1 | 530 | 18 | 370 | 750 |

(2) Manufacture of Condenser

An etched aluminum foil (an anode foil) was connected to an anode lead terminal, and was then subjected to a chemical conversion treatment (an oxidation treatment) by applying a voltage of 100 V within a 10% by mass aqueous solution of ammonium adipate, thereby forming a dielectric layer on the surface of the aluminum foil and completing preparation of a condenser intermediate.

Next, an opposing aluminum cathode foil with a cathode lead terminal welded thereto was laminated to the anode foil of the condenser intermediate, with a cellulose separator disposed therebetween, and the resulting laminate was then wound to form a condenser element.

A process in which this condenser element was dipped, under reduced pressure conditions, in the conductive polymer solution prepared in (1) above, and subsequently dried for 10 minutes at 120° C. in a hot air dryer, was repeated three times, thereby forming a solid electrolyte layer on the surface of the dielectric layer of the condenser element.

Subsequently, the condenser element with the solid electrolyte layer formed thereon was packed in an aluminum case and sealed with a sealing rubber to complete preparation of a condenser.

The electrostatic capacitance at 120 Hz, the initial value of the equivalent series resistance (ESR) at 100 kHz, and the ESR value after standing for 1,000 hours at 105° C. were measured for the prepared condenser using a LCZ meter 2345 (manufactured by NF Corporation). The results of these measurements are shown in Table 6.

Example 30

With the exception of adding, to 100 g of the complex solution obtained in section (1) of Example 29, 0.36 g of 25% by mass ammonia water as an alkaline compound, followed by 4.5 g of thiodiethanol as a conductivity improver, a conductive polymer solution with a pH of 8.4 was prepared in the same manner as Example 29. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Example 31

With the exception of adding, to 100 g of the complex solution obtained in section (1) of Example 29, 0.36 g of 25% by mass ammonia water, followed by 2.5 g of methyl gallate, a conductive polymer solution with a pH of 8.2 was prepared in the same manner as Example 29. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Example 32

With the exception of adding, to 100 g of the complex solution obtained in section (1) of Example 29, 4.5 g of tartaric acid, and then diethylamine as an alkaline compound, a conductive polymer solution with a pH of 7.5 was prepared in the same manner as Example 29. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Example 33

With the exception of adding, to 100 g of the complex solution obtained in section (1) of Example 29, 2.0 g of imidazole and 3.0 g of diethylene glycol dimethyl ether, a conductive polymer solution with a pH of 8.1 was prepared in the same manner as Example 29. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Example 34

With the exception of adding, to 100 g of the complex solution obtained in section (1) of Example 29, 0.36 g of 25% by mass ammonia water and 3.0 g of tetraethylene glycol dimethyl ether, a conductive polymer solution with a pH of 8.6 was prepared in the same manner as Example 29. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Example 35

With the exception of adding, to 100 g of the complex solution obtained in section (1) of Example 29, 2.5 g of 1-(2-hydroxyethylimidazole) and 3.0 g of ethylene glycol diglycidyl ether, a conductive polymer solution with a pH of 8.3 was prepared in the same manner as Example 29. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Example 36

With the exception of adding, to 100 g of the complex solution obtained in section (1) of Example 29, 0.36 g of 25% by mass ammonia water and 6.0 g of acryl glycidyl ether, a conductive polymer solution with a pH of 8.5 was prepared in the same manner as Example 29. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Example 37

With the exception of adding, to 100 g of the complex solution obtained in section (1) of Example 29, 2.5 g of 1-(2-hydroxyethylimidazole) and 4.5 g of N,N-dimethylacrylamide, a conductive polymer solution with a pH of 8.3 was prepared in the same manner as Example 29. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Example 38

With the exception of adding, to 100 g of the complex solution obtained in section (1) of Example 29, 0.30 g of 25% by mass ammonia water and 5 g of maleimide, a conductive polymer solution with a pH of 8.1 was prepared in the same manner as Example 29. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Example 39

With the exception of adding, to 100 g of the complex solution obtained in section (1) of Example 29, 0.30 g of 25% by mass ammonia water, 3.0 g of tetraethylene glycol dimethyl ether and 5 g of N,N-dimethylacetamide, a conductive polymer solution with a pH of 8.1 was prepared in the same manner as Example 29. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Example 40

With the exception of adding, to 100 g of the complex solution obtained in section (1) of Example 29, 2.5 g of vinylimidazole, 5.0 g of N-vinylpyrrolidone and 4.0 g of acryl glycidyl ether, a conductive polymer solution with a pH of 8.1 was prepared in the same manner as Example 29. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Comparative Example 14

With the exception of not adding the diethylene glycol to the complex solution obtained in section (1) of Example 29, a conductive polymer solution with a pH of 2.0 was prepared in the same manner as Example 29. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Comparative Example 15

To 100 g of the complex solution obtained in section (1) of Example 29 was added 0.36 g of 25% by mass ammonia water, yielding a conductive polymer solution with a pH of 8.6. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Comparative Example 16

To 100 g of the complex solution obtained in section (1) of Example 29 was added 6.0 g of ethylene glycol, yielding a conductive polymer solution with a pH of 2.1. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

Comparative Example 17

To 100 g of the complex solution obtained in section (1) of Example 29 was added 7.5 g of N-methylpyrrolidone, yielding a conductive polymer solution with a pH of 2.1. Using the same method as Example 29, a conductive coating was then formed, and the electrical conductivity of the conductive coating was measured. Further, a condenser was also prepared in the same manner as Example 29, and the electrostatic capacitance at 120 Hz, the initial ESR value at 100 kHz, and the ESR value after standing for 1,000 hours at 105° C. were measured for the condenser. The results of these measurements are shown in Table 6.

All the conductive coatings of Examples 29 to 40, which were formed by applying a conductive polymer solution containing a π-conjugated conductive polymer, a polyanion, a conductivity improver, an alkaline compound and a solvent, exhibited high electrical conductivity values. Further, each the condenser prepared by using the conductive coatings of Examples 29 to 40 as solid electrolyte layers exhibited a high electrostatic capacitance and a low ESR value.

The conductive coating of Comparative Example 15 that contained no conductivity improver had a low electrical conductivity. Further, the condenser prepared using the conductive coating of Comparative Example 15 as the solid electrolyte layer had a high ESR value.

Furthermore, in the case of the conductive coatings of Comparative Examples 16 and 17, which contained no alkaline compound, although the electrical conductivity was high, the electrostatic capacitance was low and the ESR was high.

The invention claimed is:
1. A condenser, comprising an anode composed of a valve metal, a dielectric layer formed by oxidation of a surface of said anode, and a solid electrolyte layer formed on a surface of said dielectric layer, wherein said solid electrolyte layer comprises a π-conjugated conductive polymer, a polyanion, a conductivity improver, and a silane coupling agent, and wherein said solid electrolyte layer is provided from a conductive polymer solution and a pH of said conductive polymer solution at 25° C. is within a range of 3 to 13 and said conductive polymer solution comprises an alkaline compound.

2. A condenser according to claim 1, wherein said conductivity improver is one or more compounds selected from the group consisting of nitrogen-containing aromatic cyclic compounds, compounds containing two or more hydroxyl groups, compounds containing two or more carboxyl groups, compounds containing one or more hydroxyl groups and one or more carboxyl groups, compounds containing an amide group, compounds containing an imide group, lactam compounds, and compounds containing a glycidyl group.

3. A process for manufacturing a condenser, comprising:
adhering a conductive polymer solution comprising a π-conjugated conductive polymer, a polyanion, a conductivity improver, an alkaline compound, a silane coupling agent and a solvent to a surface of a dielectric layer formed by oxidizing a surface of an anode composed of a valve metal, and drying said conductive polymer solution adhered to said surface of said dielectric layer, and wherein a pH of said conductive polymer solution at 25° C. is within a range of 3 to 13.

4. A conductive polymer solution comprising a π-conjugated conductive polymer, a polyanion, a conductivity improver selected from the group consisting of nitrogen-containing aromatic cyclic compounds, compounds containing two or more carboxyl groups, compounds containing one or more hydroxyl groups and one or more carboxyl groups, compounds containing an imide group, and compounds containing a glycidyl group, an alkaline compound and a solvent, and
wherein a pH of said conductive polymer solution at 25° C. is within a range of 3 to 13.

5. A conductive polymer solution according to claim 4, wherein said alkaline compound is a nitrogen-containing aromatic cyclic compound.

6. A conductive polymer solution according to claim 4, wherein said solvent is a mixed solvent containing water and an organic solvent having a boiling point of 100° C. or higher at a pressure of 0.1 MPa.

7. A conductive coating, formed by applying and drying a conductive polymer solution of claim 4.

8. A condenser, comprising an anode composed of a valve metal, a dielectric layer formed by oxidation of a surface of said anode, and a solid electrolyte layer formed on a surface of said dielectric layer, wherein said solid electrolyte layer is formed from a conductive coating of claim 7.

9. A process for manufacturing a condenser, comprising:
forming a solid electrolyte layer by applying a conductive polymer solution of claim 4 to a surface of a dielectric layer formed by oxidizing a surface of an anode composed of a valve metal.

* * * * *

UNITED STATES PATENT AND TRADEMARK OFFICE
CERTIFICATE OF CORRECTION

PATENT NO.       : 8,472,165 B2                                         Page 1 of 1
APPLICATION NO. : 12/278605
DATED            : June 25, 2013
INVENTOR(S)      : Ning et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 985 days.

Signed and Sealed this
Eighth Day of September, 2015

Michelle K. Lee
*Director of the United States Patent and Trademark Office*